(12) United States Patent
Kim et al.

(10) Patent No.: US 8,477,277 B2
(45) Date of Patent: Jul. 2, 2013

(54) DISPLAY SUBSTRATE, METHOD OF MANUFACTURING THE SAME AND DISPLAY PANEL HAVING THE SAME

(75) Inventors: Dong-Gyu Kim, Yongin-si (KR); Hye-Seok Na, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 501 days.

(21) Appl. No.: 12/773,471

(22) Filed: May 4, 2010

(65) Prior Publication Data
US 2011/0096278 A1 Apr. 28, 2011

(30) Foreign Application Priority Data

Oct. 28, 2009 (KR) .................. 10-2009-0102560

(51) Int. Cl.
*G02F 1/1343* (2006.01)
(52) U.S. Cl.
USPC ............................................. 349/139
(58) Field of Classification Search
USPC ............................................. 349/139
See application file for complete search history.

(56) References Cited

U.S. PATENT DOCUMENTS

| | | | | |
|---|---|---|---|---|
| 6,791,631 B2 * | 9/2004 | Cheng et al. | | 349/39 |
| 7,379,145 B2 * | 5/2008 | Chung | | 349/141 |
| 7,924,352 B2 * | 4/2011 | Hsiao et al. | | 349/37 |
| 8,228,478 B2 * | 7/2012 | Maede et al. | | 349/143 |
| 2004/0036815 A1 * | 2/2004 | Kim et al. | | 349/38 |
| 2004/0041970 A1 * | 3/2004 | Lee et al. | | 349/141 |
| 2005/0206822 A1 * | 9/2005 | Lee | | 349/141 |
| 2006/0001815 A1 * | 1/2006 | Kim et al. | | 349/141 |
| 2006/0227276 A1 * | 10/2006 | Son | | 349/141 |
| 2007/0165146 A1 * | 7/2007 | Park et al. | | 349/38 |
| 2009/0141228 A1 * | 6/2009 | Shih et al. | | 349/139 |
| 2010/0020257 A1 * | 1/2010 | Jun et al. | | 349/44 |

OTHER PUBLICATIONS

"Dielectric properties of polyester reinforced with carbon black particles", by Abdullah et al, Applied Mechanics and Materials, vols. 110-116, pp. 170-176, 2012.*

* cited by examiner

*Primary Examiner* — Mark Robinson
*Assistant Examiner* — Robert Tavlykaev
(74) *Attorney, Agent, or Firm* — H.C. Park & Associates, PLC

(57) ABSTRACT

A display substrate includes a first shield pattern, a second shield pattern and a transparent electrode. The first shield pattern is disposed adjacent to a first data line. The second shield pattern is disposed adjacent to a second data line to face the first data line. The transparent electrode includes a first pixel electrode coupled to the first data line and the first shield pattern, and a second pixel electrode coupled to a first power line and the second shield pattern. The first pixel electrode and the second pixel electrode are disposed in an alternating arrangement. The transparent electrode is partially overlapped with at least one of the first data line or the second data line. In this approach, when a black image is displayed, light leakage can be prevented.

19 Claims, 20 Drawing Sheets

DISPLAY SUBSTRATE, METHOD OF MANUFACTURING THE SAME AND DISPLAY PANEL HAVING THE SAME

CROSS-REFERENCE TO RELATED APPLICATION

This application claims priority to and the benefit of Korean Patent Application No. 2009-0102560, filed on Oct. 28, 2009, which is hereby incorporated by reference for all purposes as if fully set forth herein.

BACKGROUND OF THE INVENTION

1. Field of the Invention

Exemplary embodiments of the present invention relate to a display substrate, a method of manufacturing the display substrate and a display device having the display substrate. More particularly, exemplary embodiments of the present invention relate to a display panel to prevent light leakage, a method of manufacturing a display substrate and a display device having the display substrate.

2. Description of the Background

A liquid crystal display (LCD) device has been adopted as one of the most widely used for flat panel display devices. Typically, the LCD device includes a display substrate on which electric field generating electrodes such as pixel electrodes are formed and a substrate is provided opposite to the display substrate. In addition, the LCD device includes a liquid crystal (LC) layer interposed between the display substrate and the opposite substrate.

A conventional LCD device displays images by applying voltages to electric-field-generating-electrodes to generate an electric field in the LC layer and to control the orientation of the LC molecules in the LC layer that affect the polarization direction of light passing therethrough.

The LC molecules of the LC layer can be oriented in a vertical alignment (VA) mode due to an electric field formed between pixel electrodes. For example, an LCD panel displays a black image when the electric field is not applied between the pixel electrodes, and an LCD panel displays images with various gradations when a horizontal electric field is applied between the pixel electrodes. In this approach, when an equal voltage is applied to the pixel electrodes, a black image may be realized. However, when the different voltages are applied to the pixel electrodes, a horizontal electric field can be generated between the data line and the respective pixel electrodes that can cause light leakage.

Therefore, there is a need for an approach to prevent the light leakage.

SUMMARY OF THE INVENTION

Exemplary embodiments of the present invention provide a display substrate to prevent light leakage when a display panel displays a black image, and a method of manufacturing a display device having the display substrate capable of improving contrast for the display device.

Additional features of the invention will be set forth in the description which follows, and in part will be apparent from the description, or may be learned by practice of the invention.

Exemplary embodiments of the present invention disclose a display substrate. The display substrate includes a first shield pattern formed adjacent to a first data line. The display substrate includes a second shield pattern formed adjacent to a second data line facing the first data line. The display substrate also includes a transparent electrode comprising a first pixel electrode which is coupled to the first data line and the first shield pattern, and a second pixel electrode which is coupled to a first power line and the second shield pattern. The first pixel electrode and the second pixel electrode are disposed in an alternating arrangement. The transparent electrode is partially overlapped with at least one of the first data line or the second data line.

Exemplary embodiments of the present invention disclose a method of manufacturing a display substrate. The method includes forming a gate line and a power line extended in a first direction, a first shield pattern extended in a second direction and a second shield pattern facing the first shield pattern on a substrate. The method includes forming a first data line extended in the second direction adjacent to the first shield pattern and a second data line adjacent to the second shield pattern to face with the first data line. The method also includes forming a transparent electrode partially to overlap with at least one of the first data line and the second data line, the transparent electrode comprising a first pixel electrode partially overlapped with a first end portion of the first shield pattern to couple to the first shield pattern, the gate line and a first data line, and a second pixel electrode being partially overlapped with a first end portion of the second shield pattern and being alternately disposed with the first pixel electrode to couple to the gate line and the first power line.

Exemplary embodiments of the present invention disclose a display panel. The display panel includes a first shield pattern formed adjacent to a first data line. The display panel includes a second shield pattern formed adjacent to a second data line facing the first data line. The display panel also includes a transparent electrode comprising a first pixel electrode coupled to the first data line and the first shield pattern, and a second pixel electrode coupled to a first power line and the second shield pattern. The first pixel electrode and the second pixel electrode are disposed in an alternating arrangement. The transparent electrode is partially overlapped with at least one of the first data line or the second data line. The display panel further includes a substrate comprising a light-blocking pattern formed in opposite to a substrate to display. And a liquid crystal layer interposed between the substrates.

Exemplary embodiments of the present invention disclose a display panel. The display panel includes a substrate, a gate line and a first and a second data lines to define a pixel region, a power line disposed on the substrate, a first shield pattern formed adjacent to the first data line and a second shield pattern formed adjacent to the second data line facing the first data line, and a transparent electrode comprising a first pixel electrode coupled to the first data line and the first shield pattern, and a second pixel electrode coupled to the power line and the second shield pattern. The first pixel electrode and the second pixel electrode are disposed in an alternating arrangement. The transparent electrode is partially overlapped with one of the data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
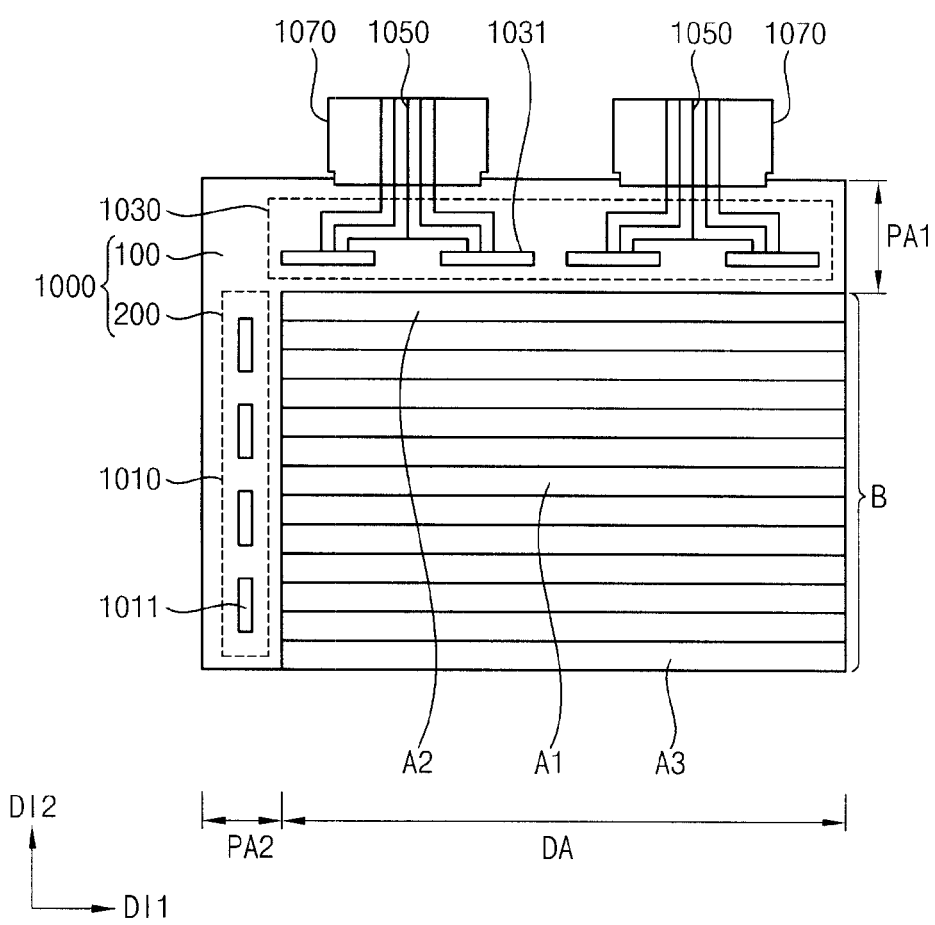
FIG. 1 is a plan view illustrating a display device, according to exemplary embodiments of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It is understood that when an element or layer is referred to as being "on," "connected to" or "coupled to" another element or layer, it can be directly on, connected or coupled to the other element or layer or intervening elements or layers may be present. However, when an element is referred to as being "directly on," "directly connected to" or "directly coupled to" another element or layer, there are no intervening elements or layers present. Like numerals refer to like elements throughout. As used herein, the term "and/or" includes any part, combinations of two or more parts, and combinations all part of the associated listed items.

It is observed that, although the terms using numerical terms such as first, second, third herein to describe various elements, components, regions, layers and/or sections, these elements, components, regions, layers and/or sections should not be limited by these numerical terms. These numerical terms are only used to distinguish one element, component, region, layer or section from another element, component, region, layer or section.

It is also noted that terms related spatial relationships, such as "beneath," "below," "lower," "above," and "upper," these terms may be used herein to describe one element or feature's relationship to another element(s) or feature(s) as illustrated in the figures. It is understood that the spatially relative terms are intended to show different orientations of the device based on an orientation standard element or feature depicted in the figures. For example, if a device seen in the figures is turned over, elements described as "below" or "beneath" other elements or features can then be oriented "above" or "on" according to changing direction of the orientation standard element or feature. Thus, the term "below" can cover both an "above" and "below" by way of configurations. According to the configurations, the device may be otherwise be oriented to a direction (e.g., rotated to 90 degrees or at other orientations) and the spatially relative terms used herein associated with other elements and/or features can be interpreted accordingly.

The terminology used herein is for the purpose of describing exemplary embodiments only and is not intended to be limiting of the present invention. As used herein, the singular forms "a," "an" and "the" may include the plural forms as well, unless the context clearly indicates otherwise. It is further understood that the terms "comprises" and/or "comprising," when used in this specification to specify the presence of stated features, integers, steps, operations, elements, and/or components, but these terms do not preclude the presence or addition of one or more other features, integers, steps, operations, elements, components, and/or groups thereof.

Exemplary embodiments of the invention are described herein with reference to cross-sectional illustrations that are schematic illustrations of exemplary embodiments (and intermediate structures) of the present invention. As such, various exemplary embodiments are illustrated by way of examples, and not by way of limitation, for example, variations due to manufacturing techniques and/or tolerances are to be expected. Thus, illustrated examples and embodiments of the present invention should not be construed as limited to the particular shapes of regions illustrated herein but are to be constructed to include deviations of the shapes from manufacturing techniques and options. For example, an implanted region illustrated as a rectangular shape, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are illustrative in nature and their shapes are not intended to restrict the actual shape of a region of a device and are not intended to limit the scope of the present invention.

Unless otherwise defined, all terms (including technical and scientific terms) used herein have the similar meanings as commonly understood by one of ordinary skill in the art to which this invention belongs. It is further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention can be explained in detail with reference to the accompanying drawings.

FIG. 1 is a plan view illustrating a display device, according to exemplary embodiments of the present invention.

Referring to FIG. 1, the display apparatus may include a display panel 1000, a gate line driving part 1010 provided to drive the display panel 1000 and a data line driving part 1030 provided to drive the display panel 1000.

The display panel 1000 may include a display substrate 100, an opposite substrate (i.e., a color filter substrate) 200 combined with the display substrate 100, and a liquid crystal (LC) layer (not shown) interposed between the display substrate 100 and the opposite substrate 200. For example, the display panel 1000 may include a display area DA, a first peripheral area PA1 which can surround the display area DA and a second peripheral area PA2 which can surround the display area DA.

A data line delivering a data signal and a gate line delivering a gate signal are formed on the display area DA. The gate line can be extended in a first direction DI1, and the data line can be extended in a second direction DI2. For example, the first direction DI1 may perpendicular to the second direction DI2.

In some examples, the first peripheral area PA1 can be positioned at a first end portion of the data lines, and the second peripheral area PA2 can be positioned at a first end portion of the gate lines. As shown in FIG. 1, the second peripheral area PA2 may be disposed at a left side of the display area DA when viewed on a plan view. For example, the second peripheral area PA2 may be disposed at a right side of the display area DA.

The display area DA may include K blocks B (wherein, 'K' can be referred to as an odd number). In some examples, K can be thirteen. Thus, the blocks B may be divided into thirteen. Each of the blocks B may include a plurality of gate lines. A first block B1 that can be an uppermost block B of the display panel 1000 may include a first gate line, and a thirteenth block B13 that can be a lowermost block B of the display panel 1000 may include n-th gate line (wherein, 'n' can be referred to as a natural number). For example, the first gate line may represent a first gate line of the gate lines, and the n-th gate line may represent a last gate line of the gate lines.

Thus, a (2/n)-th gate line that can be an intermediate gate line may be included in a seventh block B7 that can be an intermediate block. The intermediate block B may be represented as (K+1)/2-th.

In some examples, it is contemplated that the gate lines can be odd numbers. For example, when the gate lines are even numbers, the seventh block B7 may include (n−1)/2-th gate line or (n+1)/2-th gate line.

Pixel structures of each of the blocks B may be different from each other. Hereinafter, the seventh block B7 and the first block B1 can be represented as a first area A1 and a second area A2, respectively, and the thirteenth block B13 can be represented as a third area A3.

The gate line driving part 1010 may include a shift register in which a plurality of stages can be connected one after another to each other, and may sequentially output the gate signal to the gate lines G. The gate line driving part 1010 may include at least one gate line driving chip 1011. The gate line driving part 1010 may be formed on the second peripheral area PA2. For example, the gate line driving part 1010 may be integrated on the second peripheral area PA2 of the display panel 1000 without the gate line driving chip 1011. This arrangement allows that a mounting space for components is not required, so that a slim type display device may be realized.

For example, the gate line driving chip 1011 may be attached on a tape carrier package (TCP) positioned between a printed circuit board (not shown) and a display panel.

The data line driving part 1030 may output an analog type data signal to the data lines D in synchronization with the gate signal. The data line driving part 1030 may include at least one data line driving chip 1031.

The data line driving chip 1031 may be directly attached to the first peripheral area PA1 of the display panel in a chip on glass (COG) type. The data line driving chips 1031 may provide a power line 1050 to the data line driving chips 1031 through a flexible film 1070.

The power line 1050 may be extended to the gate line driving chip 1011. Although not shown in FIG. 1, the power line 1050 extended from the data line driving chip 1031 may be disposed to electrically be connected to the gate line driving chip 1011.

Figure 2:
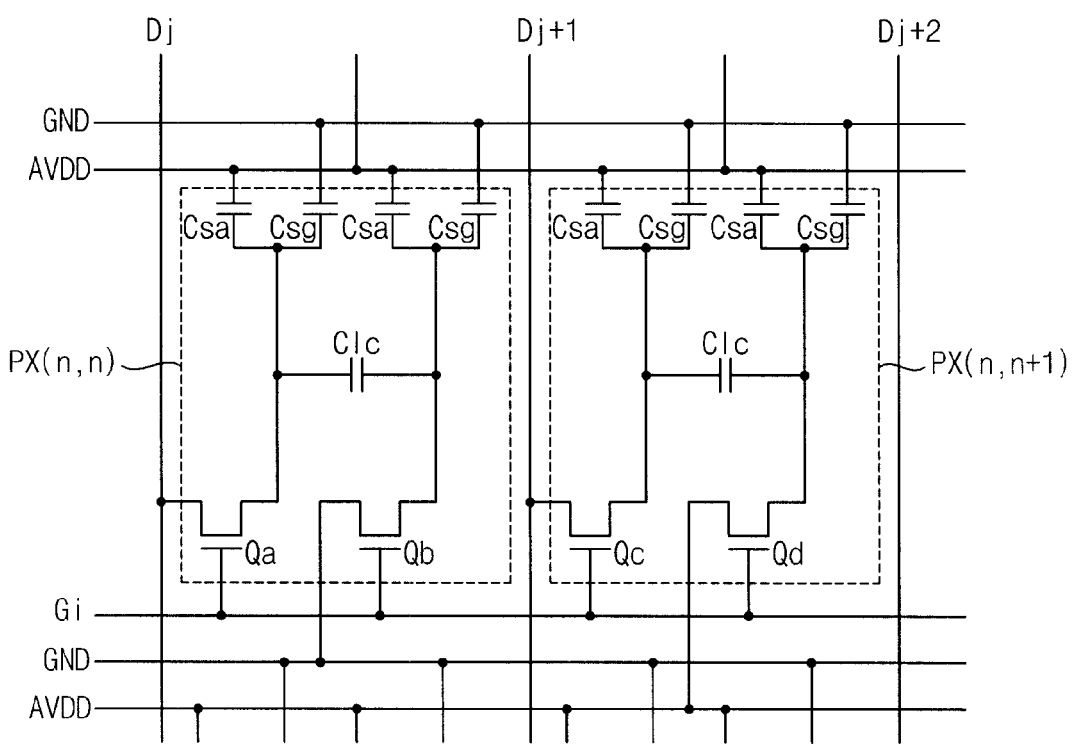
FIG. 2 is a circuit diagram illustrating a display panel of FIG. 1.

FIG. 2 is a circuit diagram illustrating a display panel of FIG. 1.

Referring to FIG. 1 and FIG. 2, the display panel may include a plurality of signal lines Dj, Dj+1, Dj+2, Gi and Gi+1), a ground line GND and a power line AVDD, wherein, 'j' and 'i' can be referred to as natural numbers.

The display panel may include a plurality of pixels arranged in a matrix shape. Each of the pixels can be connected to the signal lines Dj, Dj+1, Dj+2, Gi and Gi+1, the ground line GND and the power line AVDD.

The display panel may include the display substrate 100, the opposite substrate 200 and liquid crystal layer (not shown) interposed between the display substrate 100 and the opposite substrate 200.

In the signal lines Dj, Dj+1, Dj+2, Gi and Gi+1, a first gate line Gi and a second gate line Gi+1 can be provided to deliver gate signals (i.e., scanning signals), and a first data line Dj, a second data line Dj+1 and a third data line Dj+2 can be provided to deliver data voltages.

In some examples, the first and second gate lines Gi and Gi+1, the ground line GND and the power line AVDD can be extended in a row direction and can be arranged in parallel with each other. The first and second data lines Dj and Dj+1 can be extended in a column direction and can be arranged in parallel with each other.

The first data line Dj and the second data line Dj+1 may receive voltages having an opposite polarity to each other. The third data line Dj+2 may receive a voltage having an opposite polarity to a voltage applied to a fourth data line (not shown) adjacent to the third data line Dj+2.

The first and second data lines Dj and Dj+1 can electrically be connected to the first and third switching elements Qa and Qc, respectively. Moreover, the ground line GND and the power line AVDD can electrically be connected to the second and fourth switching elements Qb and Qd, respectively.

A transparent electrode connected to the first and second switching elements Qa and Qb can be overlapped with the power line AVDD and the ground line GND to form a plurality of storage capacitors Csa and Csg. Similarly, a transparent electrode connected to the third and fourth switching elements Qc and Qd can be overlapped with the power line AVDD and the ground line GND to form a plurality of storage capacitors Csa and Csg.

The LC layer may function as a dielectric substance between the transparent electrodes. Thus, the transparent electrodes and the LC layer may form a liquid crystal capacitor Clc.

The LC layer may have a dielectric anisotropy. When an electric field is not applied to LC molecules of the LC layer, long axises of the LC molecules may be aligned perpendicular to a surface of two display substrates.

Figure 3:
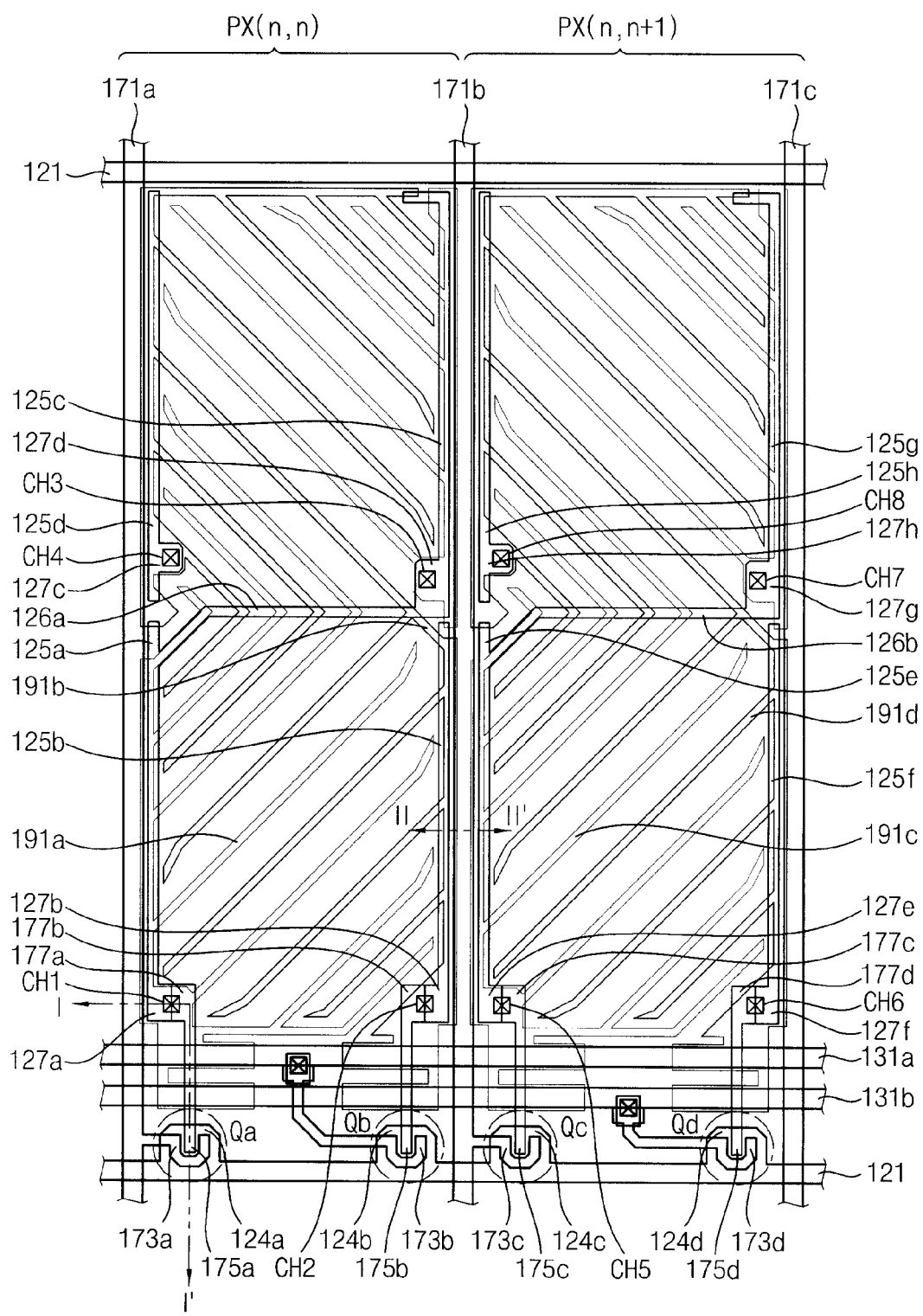
FIG. 3 is a plan view illustrating the display panel corresponding to a first area of FIG. 1.
Figure 4:
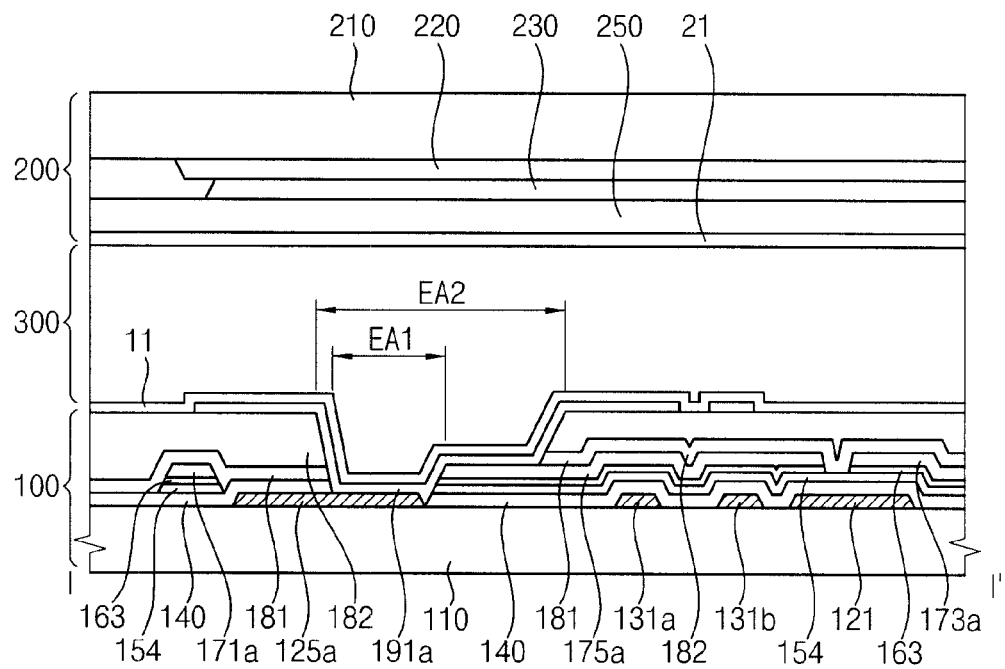
FIG. 4 is a cross-sectional view taken along line I-I' of FIG. 3.
Figure 5:
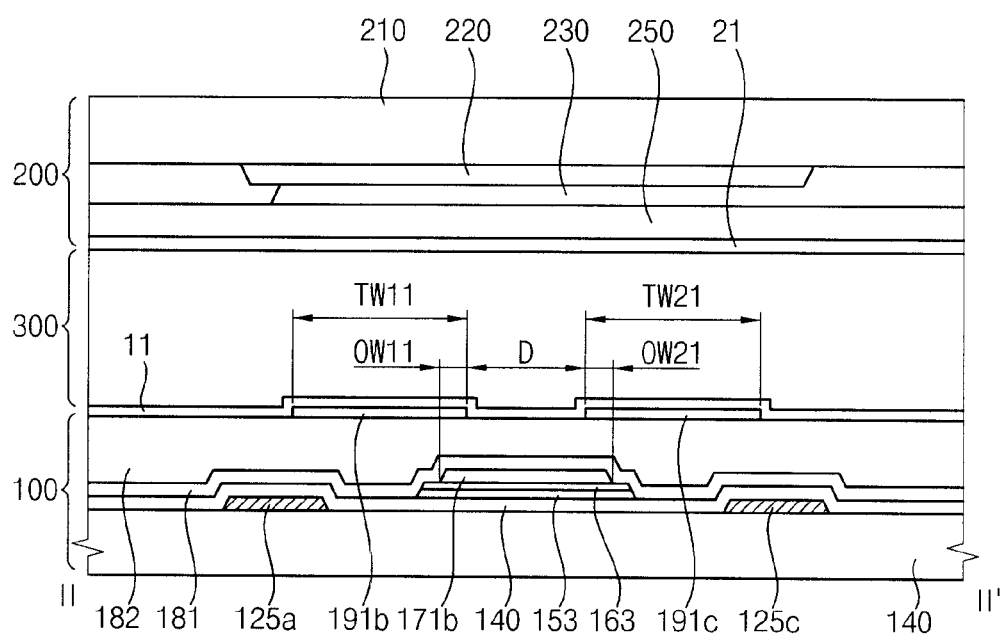
FIG. 5 is a cross-sectional view taken along line II-II' of FIG. 3.

FIG. 3 is a plan view illustrating the display panel corresponding to a first area of FIG. 1. FIG. 4 is a cross-sectional view taken along a line I-I' of FIG. 3. FIG. 5 is a cross-sectional view taken along a line II-II' of FIG. 3.

Referring to FIG. 2, FIG. 3, FIG. 4 and FIG. 5, the display panel may include a display substrate 100, an opposite substrate 200 and an LC layer 300.

The first pixel area PX(n,n) and the second pixel area PX(n,n+1) as shown in FIG. 3 can be described as an example. The first data line Dj, the second data line Dj+1 and the third data line Dj+2 as shown in FIG. 2 may represent the first data line 171a, the second data line 171b and the third data line 171c as exemplary shown in FIG. 3, respectively.

The first gate line Gi of FIG. 2 may represent the gate line 121 of FIG. 3. The ground line GND and the power line AVDD of FIG. 2 may represent the first power line 131a and the second power line 131b of FIG. 3, respectively.

Moreover, the first and third switching elements Qa and Qc can electrically be connected to the first and second data lines 171a and 171b, respectively, and the second and fourth switching elements Qb and Qd can electrically be connected to the first power line 131a and the second power line 131b, respectively.

The display substrate 100 may include a lower base substrate 110 on which a plurality of pixel areas P may be defined. In FIG. 3, a first pixel area PX(n,n) and a second pixel area PX(n,n+1) can be formed.

A plurality of gate metallic layers, which may include a gate line 121, a first power line 131a, a second power line 131b and first shield pattern to eighth shield pattern 125a, 125b, 125c, 125d, 125e, 125f, 125g and 125h that can be formed on the lower base substrate 110.

The gate line 121 may deliver a gate signal to be extended in a horizontal direction when viewed on a plan view. Each of the gate lines 121 may include a first gate electrode 124a, a second gate electrode 124b, a third gate electrode 124c and a fourth gate electrode 124d that can be extended toward an upper portion when viewed on a plan view.

In some examples, from the first to fourth gate electrodes 124a, 124b, 124c and 124d may have a rectangular shape. It should be understood that a shape and an arrangement of the first gate electrode to fourth gate electrode 124a, 124b, 124c and 124d may be altered.

The first power line 131a and the second power line 131b may receive a predetermined voltage such as a first voltage and a second voltage. The first and second power lines 131a and 131b can be extended in a horizontal direction when viewed on a plan view. For example, the first and second power lines 131a and 131b may receive different voltages.

From the first shield pattern to eighth shield pattern 125a, 125b, 125c, 125d, 125e, 125f, 125g and 125h can be extended in a vertical direction when viewed on a plan view. The first to eighth shield pattern 125a, 125b, 125c, 125d, 125e, 125f, 125g and 125h can be formed at edge portions of the pixel areas in a vertical direction.

A gate insulation layer 140 can be formed on the lower base substrate 110 to cover the gate line 121, the first and second power lines 132 and 131b, from the first to eighth shield patterns 125a, 125b, 125c, 125d, 125e, 125f, 125g and 125h, and from the first to fourth gate electrodes 124a, 124b, 124c and 124d.

A semiconductor layer 154 can be formed on the gate insulation layer 140. For example, the semiconductor layer 154 may include hydrogenated amorphous silicon (a-Si) or poly-silicon (poly-Si). Each of the semiconductor layers 154 can be disposed on from the first gate electrode to fourth gate electrode 124a, 124b, 124c and 124d.

An ohmic contact layer 163 can be formed on the semiconductor layer 154. In some examples, the ohmic contact layer 163 may include n+ hydrogenated amorphous silicon doped with n type dopants such as phosphorus (P) at a high concentration. For example, the ohmic contact layer 163 may include silicide. The ohmic contact layers 163 may be spaced apart from each other in correspondence with the first switching element Qa, the second switching element Qb, the third switching element Qc and the fourth switching element Qd.

A data metallic layer can be formed on the lower base substrate 110 in which the ohmic contact layer 163 can be formed. The data metallic layer may include, for example, a first data line 171a, a second data line 171b, a third data line 171c, a first source electrode 173a, a second source electrode 173b, a third source electrode 173c, a fourth source electrode 173d, a first drain electrode 175a, a second drain electrode 175b, a third drain electrode 175c and a fourth drain electrode 175d.

The first, second and third data lines 171a, 171b and 171c may deliver a data signal. The first, second and third data lines 171a, 171b and 171c can be extended in a vertical direction to across the gate line 121. From the first to eighth shield patterns 125a, 125b, 125c, 125d, 125e, 125f, 125g and 125h can be formed in parallel with the first, second and third data lines 171a, 171b and 171c.

In some examples, the first and second data lines 171a and 171b may receive different voltages. Similarly, the second and third data lines 171b and 171c may receive different voltages.

The first source electrode 173a and the third source electrode 173c can respectively be protruded from the first and second data lines 171a and 171b, when viewed on a plan view, having a U-shape toward the first and third gate electrodes 124a and 124c. Similarly, the second source electrode 173b and the fourth source electrode 173d can respectively be protruded from the first and second data lines 171a and 171b, when viewed on a plan view, having a U-shape toward the second and fourth gate electrodes 124b and 124d.

A first end portion of the first drain electrode 175a can be surrounded by the first source electrode 173a which can be bent toward a center portion of the first gate electrode 124a. A first end portion of the second drain electrode 175b can be surrounded by the second source electrode 173b which can be bent toward a center portion of the second gate electrode 124b. A first end portion of the third drain electrode 175c can be surrounded by the third source electrode 173c which can be bent toward a center portion of the third gate electrode 124c. A first end portion of the fourth drain electrode 175d can be surrounded by the fourth source electrode 173d which can be bent toward a center portion of the fourth gate electrode 124d.

The first gate electrode 124a, the first source electrode 173a, the first drain electrode 175a and the semiconductor layer 154 may define the first switching element Qa. The second gate electrode 124b, the second source electrode 173b, the second drain electrode 175b and the semiconductor layer 154 may define the second switching element Qb. The third gate electrode 124c, the third source electrode 173c, the third drain electrode 175c and the semiconductor layer 154 may define the third switching element Qc. The fourth gate electrode 124d, the fourth source electrode 173d, the fourth drain electrode 175d and the semiconductor layer 154 may define the fourth switching element Qd.

In some examples, channels of the first, second, third and fourth switching elements Qa, Qb, Qc and Qd may respectively be formed on the semiconductor layer 154 between from the first to fourth source electrodes 173a, 173b, 173c and 173d and from the first to fourth drain electrodes 175a, 175b, 175c and 175d.

The ohmic contact layer 163 can be disposed between the semiconductor layer 154 and the first to fourth source electrodes 173a, 173b, 173c and 173d to decrease a contact resistance therebetween. Similarly, the ohmic contact layer 163 can be disposed between the semiconductor layer 154 and the first to fourth drain electrodes 175a, 175b, 175c and 175d to decrease a contact resistance therebetween.

A first drain contact electrode 177a expanded from the first drain electrode 175a and a first shield contact electrode 127a expanded from the first shield pattern 125a may respectively be connected to the first pixel electrode 191a through a first contact hole CH1.

In some examples, the first drain contact electrode 177a and the first shield contact electrode 127a can be spaced apart from each other, so that the first pixel electrode 191a can electrically connect the first drain contact electrode 177a and the first shield contact electrode 127a. For example, the first drain contact electrode 177a may contact with the first shield contact electrode 127a.

The first shield pattern 125a can be extended from the first contact electrode 127a to a horizontal centerline of the first pixel area Px(n,n) corresponding to the first data line 171a along an upper direction of the first pixel area PX(n,n), so that the first shield pattern 125a can be located adjacent to the first data line 171a.

A connection pattern 126a can further be formed, which can connect between the first shield pattern 125a and the third shield pattern 125c in the horizontal centerline of the first pixel area Px(n,n). For example, the connection pattern 126a may cross the first pixel area PX(n,n) to connect the first shield pattern 125a and the third shield pattern 125c.

In an upper portion of the first pixel area PX(n,n), the third shield contact electrode 127c can electrically be connected to the first pixel electrode 191a through a third contact hole CH3 at an area adjacent to the second data line 171b. Thus, the first pixel electrodes 191c spaced apart from each other can electrically be connected to each other through the third shield pattern 125c and the third contact hole CH3. The third shield pattern 125c can be extended from a horizontal centerline adjacent to the second data line 171b along an upper direction of the first pixel area PX(n,n) so that the third shield pattern 125c can be disposed adjacent to the second data line 171b.

A second drain contact electrode 177b expanded from the second drain electrode 175b and a second shield contact electrode 127b expanded from the second shield pattern 125b can respectively be connected to the second pixel electrode 191b through a second contact hole CH2.

In some examples, the second drain contact electrode 177b and the second shield contact electrode 127b can be spaced apart from each other, so that the second pixel electrode 191b can electrically connect the second drain contact electrode 177b and the second shield contact electrode 127b. For example, the second drain contact electrode 177b can contact with the second shield contact electrode 127b.

The second shield pattern 125b can be extended from the second contact electrode 127b to a horizontal centerline of the first pixel area Px(n,n) along an upper direction of the first pixel area PX(n,n) so that the second shield pattern 125b can be disposed adjacent to the second data line 171b.

In some example, in the upper portion of the first pixel area PX(n,n), the fourth shield pattern 125d can be extended along a vertical direction of the first pixel area PX(n,n) so that the fourth shield pattern 125d can be located adjacent to the first data line 171a. For example, the fourth shield pattern 125d can electrically be connected to the second pixel 191b through a fourth contact hole CH4 disposed adjacent to the horizontal centerline of the first pixel area PX(n,n).

A third drain contact electrode 177c expanded from the third drain electrode 175c and a fifth shield contact electrode 127e expanded from the fifth shield pattern 125e can respectively be connected to the third pixel electrode 191c through a fifth contact hole CH5. In some examples, the third drain contact electrode 177c and the fifth shield contact electrode 127e can be spaced apart from each other, so that the third pixel electrode 191c can electrically connect the third drain contact electrode 177c and the fifth shield contact electrode 127e. For example, the third drain contact electrode 177c may contact with the fifth shield contact electrode 127e.

The fifth shield pattern 125e can be extended from the fifth contact electrode 127e to a horizontal centerline of the second pixel area Px(n,n+1) corresponding to the second data line 171b along an upper direction of the second pixel area PX(n,n+1), so that the fifth shield pattern 125e can be disposed adjacent to the second data line 171b.

A connection pattern 126b may further be formed to connect a region formed between the fifth shield pattern 125e and the seventh shield pattern 125g in the horizontal centerline of the second pixel area Px(n,n+1). For example, the connection pattern 126b may cross the second pixel area PX(n,n+1) to connect the fifth shield pattern 125e and the seventh shield pattern 125g.

In an upper portion of the second pixel area PX(n,n+1), the third data line 171c can electrically be connected to the third pixel electrode 191c through a seventh contact hole CH7. Thus, the third pixel electrodes 191c spaced apart from each other can electrically be connected to each other through the seventh shield pattern 125g and the seventh contact hole CH7. The seventh shield pattern 125g can be extended from a horizontal centerline adjacent to the third data line 171c along an upper direction of the second pixel area PX(n,n+1), so that the seventh shield pattern 125g can be disposed adjacent to the third data line 171c.

A fourth drain contact electrode 177d expanded from the fourth drain electrode 175d and a sixth shield contact electrode 127f expanded from the sixth shield pattern 125f can respectively be connected to the fourth pixel electrode 191d through a sixth contact hole CH6.

In some examples, the fourth drain contact electrode 177d and the sixth shield contact electrode 127f can be spaced apart from each other, so that the fourth pixel electrode 191d can electrically connect the sixth drain contact electrode 177f and the sixth shield contact electrode 127f. For example, the fourth drain contact electrode 177d may make contact with the sixth shield contact electrode 127f.

The sixth shield pattern 125f can be extended from the sixth contact electrode 127f to a horizontal centerline of the second pixel area Px(n,n+1) corresponding to the second data line 171b along an upper direction of the second pixel area PX(n,n+1), so that the sixth shield pattern 125f can be disposed adjacent to the third data line 171c.

In some examples, in the upper portion of the second pixel area PX(n,n+1), the eighth shield pattern 125h can be extended along a vertical direction of the second pixel area PX(n,n+1), so that the eighth shield pattern 125h can be disposed adjacent to the second data line 171b. For example, the eighth shield pattern 125h can electrically be connected to the fourth pixel 191d through an eighth contact hole CH8 disposed adjacent to the horizontal centerline of the second pixel area PX(n,n+1).

A data insulation layer 180 can be formed on the gate insulation layer 140 to cover the first, second and third data lines 171a, 171b and 171c, the first, second, third and fourth source electrodes 173a, 173b, 173c and 173d, and the first, second, third and fourth drain electrodes 175a, 175b, 175c and 175d.

The data insulation layer 180 may include an inorganic insulation layer 181 and an organic insulation layer 182. The inorganic insulation layer 181 can be formed to cover the first, second and third data lines 171a, 171b and 171c, the first, second, third and fourth source electrodes 173a, 173b, 173c and 173d and the first, second, third and fourth drain electrodes 175a, 175b, 175c and 175d. For example, the organic insulation layer 182 can be formed to cover the inorganic insulation layer 181.

The first contact hole CH1 can be formed through the gate insulation layer 140 and the data insulation layer 180 to exposure the first drain contact electrode 177a and the first shield contact electrode 127a. For example, the gate insulation layer 140 can be etched by a first exposing area EA1 so as to expose the first shield contact electrode 127a, and the data insulation layer 180 can be etched by a second exposing area EA2 so as to expose the first drain contact electrode 177a. The gate insulation layer 140 and the data insulation layer 180 may simultaneously be etched. Thus, the first drain contact electrode 177a and the first shield contact electrode 127a not being overlapped with each other through the first contact hole CH1 may be connected to the first pixel electrode 191a.

Similarly, a second contact hole CH2 can be formed on the gate insulation layer 140 and the data insulation layer 180 to expose the second drain contact electrode 177b and the second shield contact electrode 127b. And a fifth contact hole CH5 can be formed on the gate insulation layer 140 and the data insulation layer 180 to expose the third drain contact electrode 177c and the fifth shield contact electrode 127e. Moreover, a sixth contact hole CH6 can be formed on the gate insulation layer 140 and the data insulation layer 180 to expose the fourth drain contact electrode 177d and the sixth shield contact electrode 127f.

Each of the third, fourth, seventh and eighth contact holes CH3, CH4, CH7 and CH8 can be formed on the data insulation layer 180 to expose the third, fourth, seventh and eighth shield patterns 125c, 125d, 125g and 125h.

A first transparent electrode 191 formed from an optically transparent and electrically conductive material such as indium tin oxide (ITO) or indium zinc oxide (IZO) can be formed on the data insulation layer 180. The first transparent electrode 191 may include the first to fourth pixel electrodes 191a, 191b, 191c and 191d.

The first and third pixel electrodes 191a and 191c may receive different voltages from the first and second data lines 171a and 171b, respectively.

The second and fourth pixel electrodes 191b and 191d may receive different voltages from the first and second power lines 131a and 131b, respectively.

When a horizontal electric field is formed between the first pixel electrode 191a and the second pixel electrode 191b, various gradations can be realized. For example, to represent various gradations an applied voltage of the first data line 171a may be adjusted in accordance with the gradations.

In some examples, when a horizontal electric field is formed between the third pixel electrode 191c and the fourth pixel electrode 191d, various gradations can be realized. For example, to represent various gradations, an applied voltage of the second data line 171b may be adjusted in accordance with the gradations.

The first pixel electrode 191a and the second pixel electrode 191b can be disposed in an alternating arrangement, and the third pixel electrode 191c and the fourth pixel electrode 191d can be disposed in an alternating arrangement.

For example, the first pixel electrode 191a can be connected to the first drain contact electrode 177a and the second shield contact electrode 127a through the first contact hole CH1, and the first pixel electrode 191a can be extended to a horizontal centerline of the first pixel area PX(n,n) to partially overlap with each of the first shield pattern 125a and the first data line 171a. The first pixel electrode 191a can be extended at a lower portion of the horizontal centerline with an inclined angle of about 45 degrees with respect to an extending direction of the gate line 121, and can be extended at an upper portion of the horizontal centerline with an inclined angle of about 135 degrees with respect to the extending direction of the gate line 121.

In some examples, the first pixel electrode 191a can electrically be connected to the third shield pattern 125c through the third contact hole CH3 at an upper portion of the horizontal centerline when viewed on a plan view, and can be extended along an upper direction to partially overlap with each of the third shield pattern 125c and the second data line 171b adjacent to the second data line 171b. For example, the first pixel electrode 191a, which is extended at the upper portion of the horizontal centerline when viewed on a plan view, can be extended with an inclined angle of about 135 degrees with respect to the gate line 121.

The second pixel electrode 191b can be connected to the second drain contact electrode 177b and the second shield contact electrode 127b through the second contact hole CH2. And the second pixel electrode 191b can be extended to the horizontal centerline of the first pixel area PX(n,n) to partially overlap with each of the second shield pattern 125b and the second data line 171b. The second pixel electrode 191b can be extended at a lower portion of the horizontal centerline with an inclined angle of about 225 degrees with respect to the extending direction of the gate line 121, and a portion of the second pixel electrode 191b extended at the lower portion of the horizontal centerline can be extended at an upper portion of the horizontal centerline with an inclined angle of about 135 degrees with respect to the extending direction of the gate line 121.

Similarly, the second pixel electrode 191b, which can electrically be connected to the fourth shield pattern 125d through the fourth contact hole CH4 at an upper portion of the horizontal centerline when viewed on a plan view, can be extended along an upper direction of the horizontal centerline to partially overlap with each of the fourth shield pattern 125d and the first data line 171a adjacent to the first data line 171a. Moreover, the second pixel electrode 191b can be extended at the upper portion of the horizontal centerline when viewed on a plan view, and then can be extended with an inclined angle of about 135 degrees with respect to the gate line 121 formed at the lower portion of the horizontal centerline.

The third pixel electrode 191c can be connected to the third drain contact electrode 177c and the fifth shield contact electrode 127e through the fifth contact hole CH5, and the third pixel electrode 191c can be extended to the horizontal centerline of the second pixel area PX(n,n+1) to partially overlap with each of the fifth shield pattern 125e and the second data line 171*b*. The third pixel electrode 191*c* can be extended at a lower portion of the horizontal centerline with an inclined angle of about 45 degrees with respect to the extending direction of the gate line 121, and then can be extended at an upper portion of the horizontal centerline with an inclined angle of about 135 degrees with respect to the extending direction of the gate line 121.

Similarly, the third pixel electrode 191*c* can electrically be connected to the seventh shield pattern 125*g* through the seventh contact hole CH7 at an upper portion of the horizontal centerline when viewed on a plan view, and can be extended along an upper direction to partially overlap with each of the seventh shield pattern 125*g* and the third data line 171*c* adjacent to the third data line 171*c*. Moreover, the third pixel electrode 191*c*, which can be extended at the upper portion of the horizontal centerline when viewed on a plan view, can be extended with an inclined angle of about 135 degrees with respect to the extending direction of the gate line 121.

The fourth pixel electrode 191*d* can be connected to the fourth drain contact electrode 177*d* and the sixth shield contact electrode 127*f* through the sixth contact hole CH6, and the fourth pixel electrode 191*d* can be extended to the horizontal centerline of the second pixel area PX(n,n+1) to partially overlap with each of the sixth shield pattern 125*f* and the third data line 171*c*. The fourth pixel electrode 191*d* can be extended at a lower portion of the horizontal centerline with an inclined angle of about 225 degrees with respect to the extending direction of the gate line 121, and a portion of the fourth pixel electrode 191*d* extended at the lower portion of the horizontal centerline can be extended at an upper portion of the horizontal centerline with an inclined angle of about 135 degrees with respect to the extending direction of the gate line 121.

Similarly, the fourth pixel electrode 191*d*, which can electrically be connected to the eighth shield pattern 125*h* through the eighth contact hole CH8 at an upper portion of the horizontal centerline when viewed on a plan view, can be extended along an upper direction of the horizontal centerline to partially overlap with each of the eighth shield pattern 125*h* and the second data line 171*b* adjacent to the second data line 171*b*. The fourth pixel electrode 191*d* can be extended at the upper portion of the horizontal centerline when viewed on a plan view with an inclined angle of about 315 degrees with respect to an extending direction of the gate line 121, and then can be extended at the lower portion of the horizontal centerline with an inclined angle of about 225 degrees with respect to the extending direction of the gate line 121.

FIG. 5 is a cross-sectional view taken along a line II-II' of FIG. 3. Referring to FIG. 5, an interval distance D between the second pixel electrode 191*b* and the third pixel electrode 191*c* may be about 6 μm. For example, since a first overlapped width OW11 may cover a portion of the second pixel electrode 191*b* that can be overlapped with the second data line 171*b* can substantially be equal to a second overlapped width OW21 in which the third pixel electrode 191*c* and the second data line 171*b* can be formed. In this example a width TW11 of the second pixel electrode 191*b* and a width TW21 of the third pixel electrode 191*c* may be about 6 μm. The second overlapped width OW21 may cover a portion of the first pixel electrode 191*c* that can be overlapped with the first data line 171*a*.

In some examples, the first pixel area PX(n,n) and the second pixel area PX(n,n+1) may have rectangular shapes. For example, the first pixel area PX(n,n) and the second pixel area PX(n,n+1) may have various types of shapes such as a zigzag shape.

The lower alignment layer 11 can be formed on the lower base substrate 110 in which the first and third pixel electrodes 191*a* and 191*c* and the second pixel electrodes 191*b* and 191*d* can be formed so that the lower alignment layer 11 may be in vertical alignment with LC molecules of the LC layer 300, that can be a direction from the display substrate 100 toward the opposite substrate 200.

The opposite substrate 200 can be disposed to face the display substrate 100.

The opposite substrate 200 may include an upper base substrate 210, a light-blocking pattern 220, a color filter pattern 230, an overcoating layer 250 and an upper alignment layer 21.

The light-blocking pattern 220 may block light leakage between the first and third pixel electrodes 191*a* and 191*c* and the second and fourth pixel electrodes 191*b* and 191*d* to define an opening area in which the first and third pixel electrodes 191*a* and 191*c* can be faced with the second and fourth pixel electrodes 191*b* and 191*d*. Thus, the color filter pattern 230 can be formed on an opening area in which lights may not be blocked. For example, dielectric constant of the light-blocking pattern 220 may be no less than about 15.

The color filter pattern 230 may include, for example, a red filter, a green filter and a blue filter. The overcoating layer 250 may cover the color filter pattern 230 and the light-blocking pattern 220.

The overcoating layer 250 can be formed on the light-blocking pattern 220 and the color filter pattern 230. The overcoating layer 250 may include an insulation material. The overcoating layer 250 may prevent the color filter pattern 230 from exposing and may be formed to provide a planar surface. By way of a configuration of a manufacturing process, the overcoating layer 250 may be omitted.

The upper alignment layer 21 can be formed on the overcoating layer 250 to vertically align the LC layer 300.

The LC layer 300 can be interposed between the display substrate 100 and the opposite substrate 200. The LC layer 300 may include LC molecules having dielectric anisotropy. When an electric field is not applied to LC molecules of the LC layer, long axises of the LC molecules may be aligned in perpendicular with a surface of two display substrates 100 and 200.

An arrangement of the LC of the LC layer 300 can be altered by an electric field formed between the first pixel electrode 191*a* and the second pixel electrode 191*b*, and can be altered by an electric field formed between the third pixel electrode 191*c* and the fourth pixel electrode 191*d*. As a result, transmissivity of the LC layer 300 can be altered in accordance with strength of the electric field.

For example, when different voltages are applied to the first pixel electrode 191*a* and the second pixel electrode 191*b*, an electric field being substantially parallel with surfaces of the display substrate 100 and the opposite substrate 200 can be formed so that a white mode can be realized. When equal voltages are applied to the first pixel electrode 191*a* and the second pixel electrode 191*b*, an electric field being substantially perpendicular to surfaces of the display substrate 100 and the opposite substrate 200 can be formed so that a black mode can be realized.

Similarly, when the different voltages are applied to the third pixel electrode 191*c* and the fourth pixel electrode 191*d*, an electric field being substantially parallel with surfaces of the display substrate 100 and the opposite substrate 200 can be formed so that a white mode is realized. When equal voltages are applied to the third pixel electrode 191*c* and the fourth pixel electrode 191*d*, an electric field being substantially perpendicular to surfaces of the display substrate 100 and the opposite substrate 200 can be formed so that a black mode can be realized.

That is, long axises of LC molecules of the LC layer 300, which are vertically aligned with respect to surfaces of the display substrate 100 and the opposite substrate 200, can be inclined in a horizontal direction of an electric field, and a varying amount of polarization of an incident light incident into the liquid crystal layer 300 may be varied in accordance with an incident amount of the LC molecules. The varying of the polarization may induce a transmissitivity varying through a polarizer, and thus the display panel can display images. Thus, when vertically aligned liquid crystal molecules are used, a contrast ratio of the display device can be increased and a wide viewing angle can be realized. Moreover, if two voltages having the different polarities are applied to one pixel, a response speed of the liquid crystal molecules can be enhanced.

In some examples, when the display panel displays a black image, light leakage generated between the first to third data lines 171a, 171b and 171c and the first transparent electrode 191 can be prevented by the first to eighth shield patterns 125a, 125b, 125c, 125d, 125e, 125f, 125g and 125h and the first transparent electrode 191 which can partially be overlapped with the first to eighth shield patterns 125a, 125b, 125c, 125d, 125e, 125f, 125g and 125h and the first to third data lines 171a, 171b and 171c.

Figure 6:
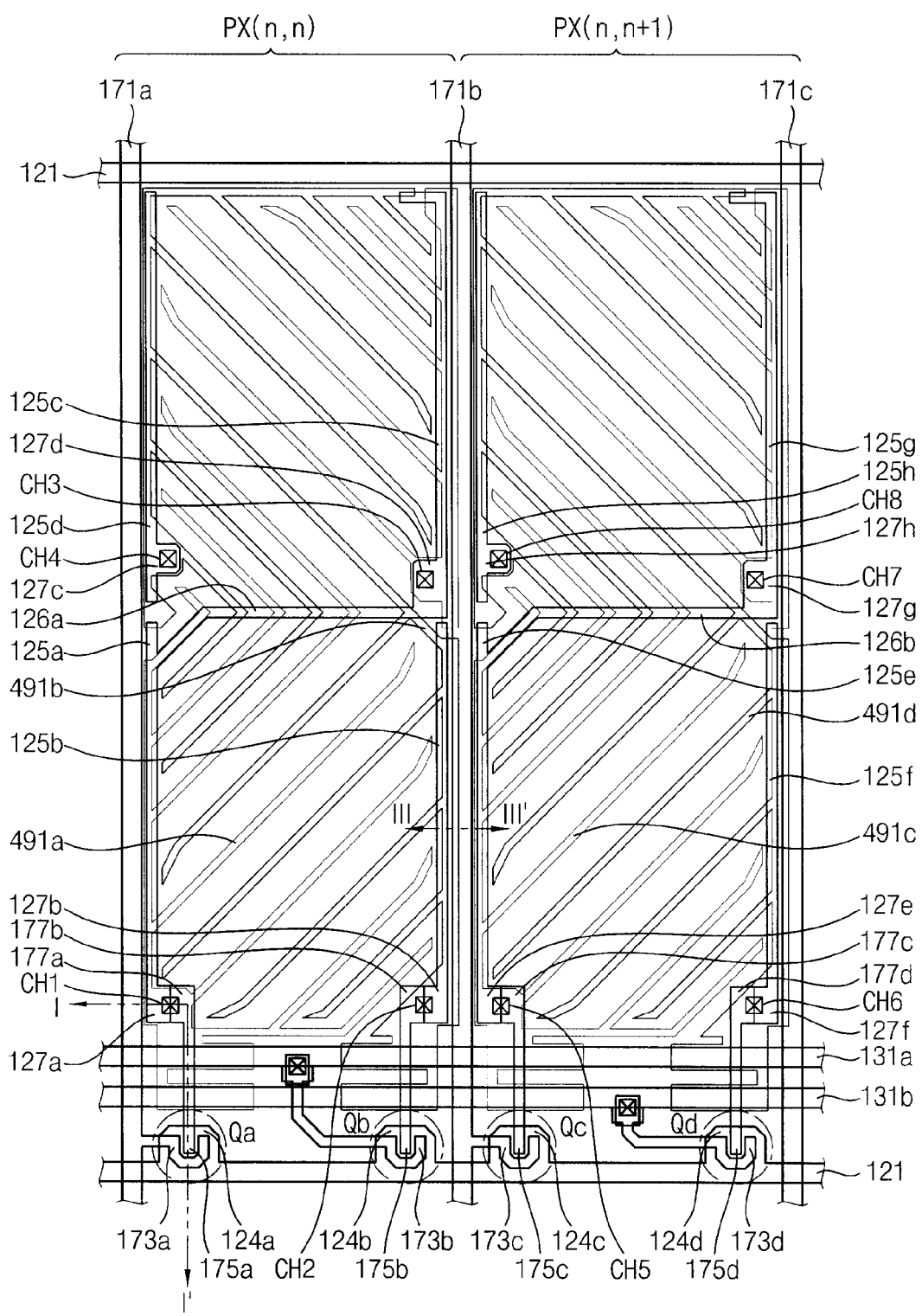
FIG. 6 is a plan view illustrating the display panel corresponding to a second area of FIG. 1.
Figure 7:
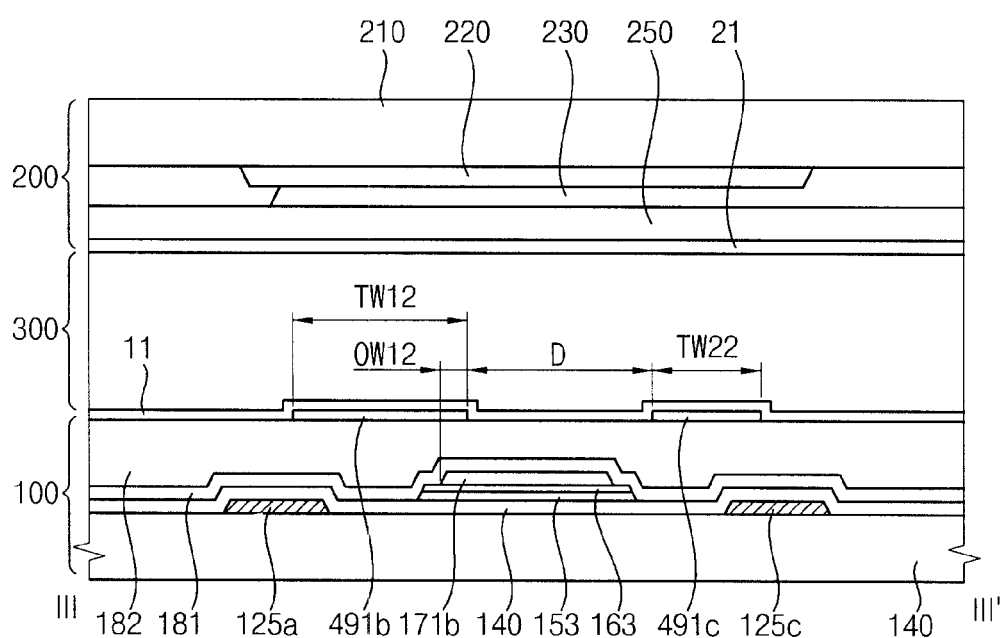
FIG. 7 is a cross-sectional view taken along line III-III' of FIG. 6.

FIG. 6 is a plan view illustrating the display panel corresponding to a second area of FIG. 1. FIG. 7 is a cross-sectional view taken along a line III-III' of FIG. 6. A cross-sectional view taken along a line I-I' of FIG. 6 may substantially be same as FIG. 4 except that the first pixel electrode 191a does not cover the first data line 171a so that the cross-sectional view taken along a line I-I' of FIG. 6 may be omitted to avoid unnecessarily obscuring the present invention.

A plan view of the display panel corresponding to a second area of FIG. 1 may substantially be same as FIG. 3 that can be a plan view of the display panel corresponding to the first area of FIG. 1 except a shape of the second transparent electrode 491. Thus, identical reference numerals used in FIG. 6 and FIG. 7 to refer to components that may be the same or like those shown in FIG. 1 and FIG. 3, and thus, a detailed description thereof will be omitted to avoid unnecessarily obscuring the present invention.

Referring to FIG. 1, FIG. 3, FIG. 4, FIG. 6 and FIG. 7, the second transparent electrode 491 may include a first pixel electrode 491a, a second pixel electrode 491b, a third pixel electrode 491c and a fourth pixel electrode 491d.

The first pixel electrode 491a may substantially be the same as the first pixel electrode 191a of FIG. 3 except that the first pixel electrode 491a cannot be overlapped with the first data line 171a and can be overlapped with the second data line 171b.

The second pixel electrode 491b may substantially be the same as the second pixel electrode 191b of FIG. 3 except that the second pixel electrode 491b cannot be overlapped with the first data line 171a and can be overlapped with the second data line 171b.

The third pixel electrode 491c may substantially be the same as the third pixel electrode 191c of FIG. 3 except that the third pixel electrode 491c cannot be overlapped with the second data line 171b and can only be overlapped with the third data line 171c.

The fourth pixel electrode 491d may substantially be the same as the fourth pixel electrode 191d of FIG. 3 except that the fourth pixel electrode 491d cannot be overlapped with the second data line 171b and can be overlapped with the third data line 171c.

Referring again to FIG. 5 and FIG. 7, an interval distance D between the second pixel electrode 491b and the third pixel electrode 491c may be about 6 μm. For example, the second pixel electrode 491b can only be overlapped with the second data line 171b. A width TW12 of the second pixel 491b may be about 7.5 μm, and a width TW22 of the third pixel electrode 491c may be about 4.5 μm. A first width OW12 in which the second pixel electrode 491b is overlapped with the second data line 171b may substantially be equal to the sum of the first width OW11 and the second width OW21 of FIG. 5.

Figure 8:
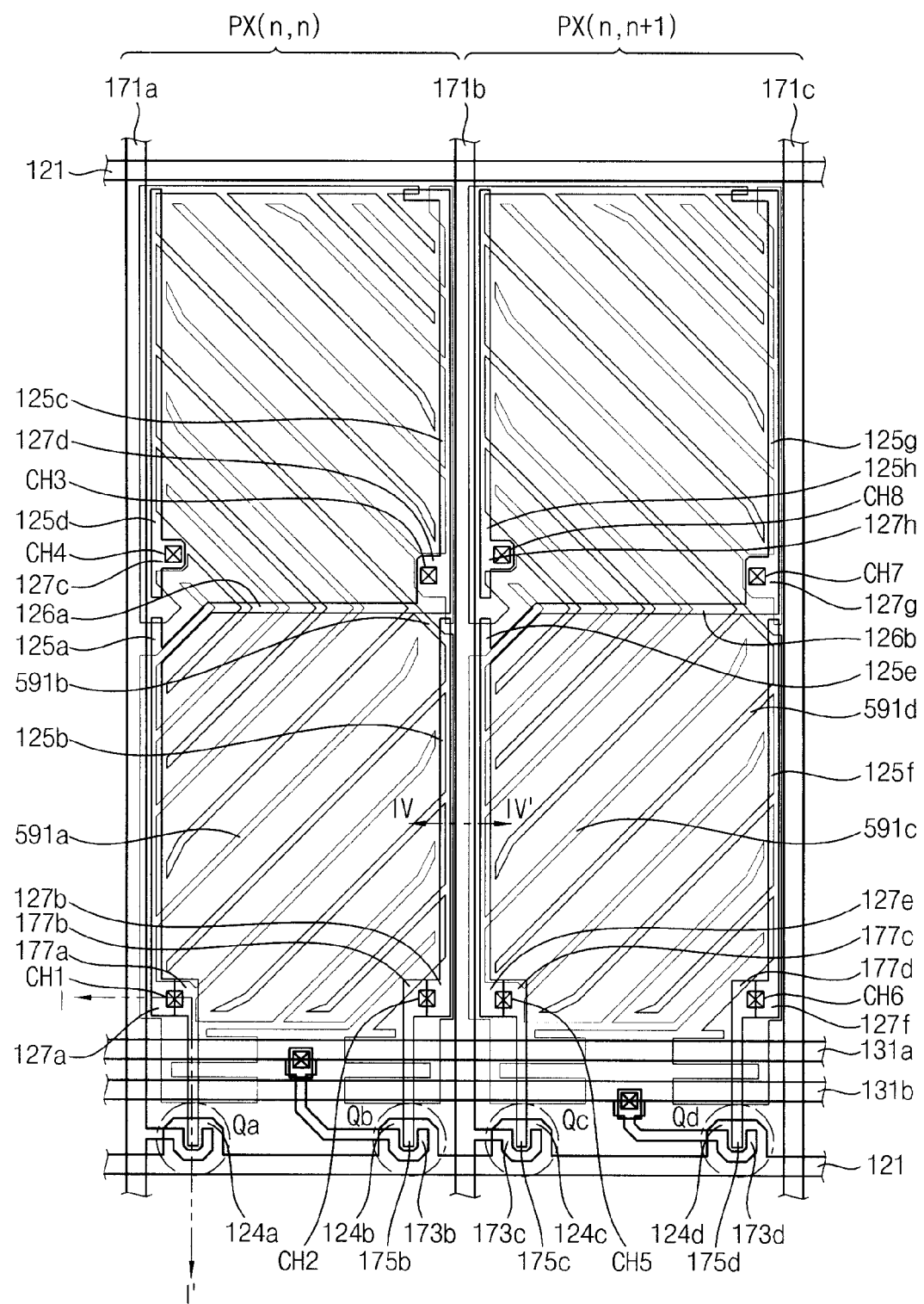
FIG. 8 is a plan view illustrating the display panel corresponding to a third area of FIG. 1.
Figure 9:
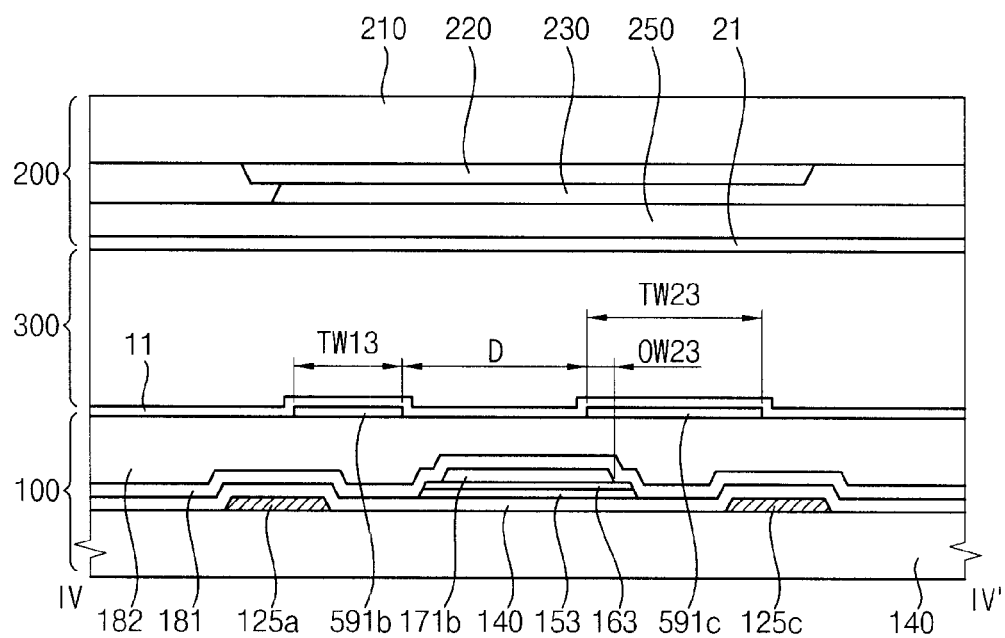
FIG. 9 is a cross-sectional view taken along line IV-IV' of FIG. 8.

FIG. 8 is a plan view illustrating the display panel corresponding to a third area of FIG. 1. FIG. 9 is a cross-sectional view taken along a line IV-IV' of FIG. 8. A cross-sectional view taken along a line I-I' of FIG. 8 may substantially be the same as FIG. 4 so that the cross-sectional view taken along a line I-I' of FIG. 8 may be omitted to avoid unnecessarily obscuring the present invention A plan view of the display panel according to the third area of FIG. 1 may substantially be the same as FIG. 3 that is a plan view of the display panel according to the first area of FIG. 1 except for a shape of a third transparent electrode 591. Thus, identical reference numerals are used in FIG. 8 and FIG. 9 to refer to components that may be the same or like those shown in FIG. 3, and thus, a detailed description thereof will be omitted to avoid unnecessarily obscuring the present invention.

Referring to FIG. 1, FIG. 3, FIG. 4, FIG. 8 and FIG. 9, the third transparent electrode 591 may include a first pixel electrode 591a, a second pixel electrode 591b, a third pixel electrode 591c and a fourth pixel electrode 591d. For example, second terminals of the first and third pixel electrodes 591a and 591c and the second and fourth pixel electrodes 591b and 591d may be represented as a first terminal of the transparent electrode 591, and first terminals of the first and third pixel electrodes 591a and 591c and second terminals of the second and fourth pixel electrodes 591b and 591d may be represented as a second terminal of the transparent electrode 591.

The first pixel electrode 591a may substantially be the same as the first pixel electrode 191a of FIG. 3 except that the first pixel electrode 591a may not be overlapped with the second data line 171b and may be overlapped with the first data line 171a.

The second pixel electrode 591b may substantially be the same as the second pixel electrode 191b of FIG. 3 except that the second pixel electrode 591b may not be overlapped with the second data line 171b and may be overlapped with the first data line 171a.

The third pixel electrode 591c may substantially be the same as the third pixel electrode 191c of FIG. 3 except that the third pixel electrode 591c may not be overlapped with the third data line 171c and may be overlapped with the second data line 171b.

The fourth pixel electrode 591d may substantially be the same as the fourth pixel electrode 191d of FIG. 3 except that the fourth pixel electrode 591d may not be overlapped with the third data line 171c and may be overlapped with the second data line 171c.

An interval distance D between the second pixel electrode 591b and the third pixel electrode 591c may be about 6 μm. For example, the third pixel electrode 591c may overlap with the second data line 171b. A width TW13 of the second pixel electrode 591b may be about 4.5 μm, and a width TW23 of the third pixel electrode 591c may be about 7.5 μm. A second width OW23 in which the third pixel electrode 591c is overlapped with the second data line 171b may be equal to a sum of the first width OW11 and the second width OW21 of FIG. 5.

That is, a sum of a width of the second pixel electrode 591b, an interval distance between the second pixel electrode 591b and the first pixel electrode 591a, and a width of the first pixel electrode 591a may be about 18 μm, which corresponds to the first area A1, the second area A2 and the third area A3, respectively.

For example, a width of the second pixel electrodes 591b formed between the first area A1 and the second area A3 may gradually be decreased, a width of the third pixel electrodes 591c may gradually be increased.

Figure 10A:
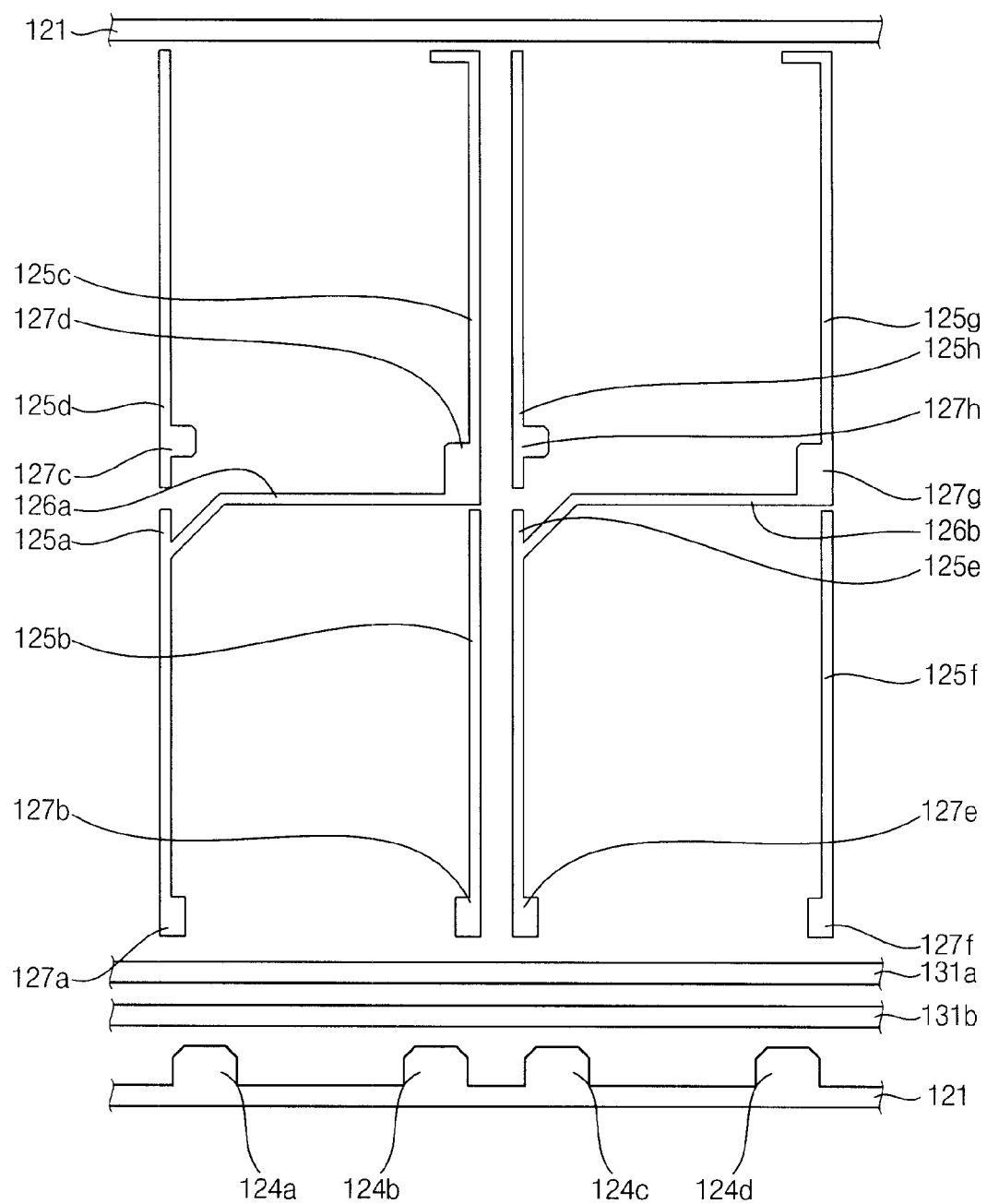
FIG. 10A and FIG. 10B are respectively a plan view and a cross-sectional view showing a method of manufacturing a gate line, first and second power lines and from first to eighth shield patterns of the display substrate of FIG. 1.
Figure 10B:
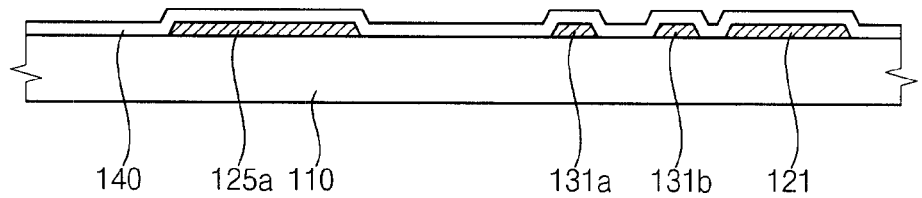

FIG. 10A and FIG. 10B are respectively a plan view and a cross-sectional view showing a method of manufacturing a gate line, first and second power lines and from first to eighth shield patterns of the display substrate of FIG. 1.

Referring to FIG. 3, FIG. 4, FIG. 10A and FIG. 10B, the gate line 121, the first to fourth gate electrodes 124a, 124b, 124c and 124d, the first power line 131a, the second power line 131b, the first to eighth shield patterns 125a, 125b, 125c, 125d, 125e, 125f, 125g and 125h, the connection patterns 126a and 126b, and the first to eighth shield contact electrodes 127a, 127b, 127c, 127d, 127e, 127f, 127g and 127h may respectively be extended from the first to eighth shield patterns 125a, 125b, 125c, 125d, 125e, 125f, 125g and 125h that may be formed on the lower base substrate 110.

For example, the gate line 121, the first power line 131a and the second power line 131b may be extended along the first direction DI1. The first to eighth shield patterns 125a, 125b, 125c, 125d, 125e, 125f, 125g and 125h may be extended along the second direction DI2.

For example, the first shield pattern 125a and the second shield pattern 125b may opposite to each other, and the third shield pattern 125c and the fourth shield pattern 125d may opposite to each other. Similarly, the fifth shield pattern 125e and the sixth shield pattern 125f may opposite to each other, and the seventh shield pattern 125g and the eighth shield pattern 125h may opposite to each other.

The gate insulation layer 140 may be formed.

Figure 11A:
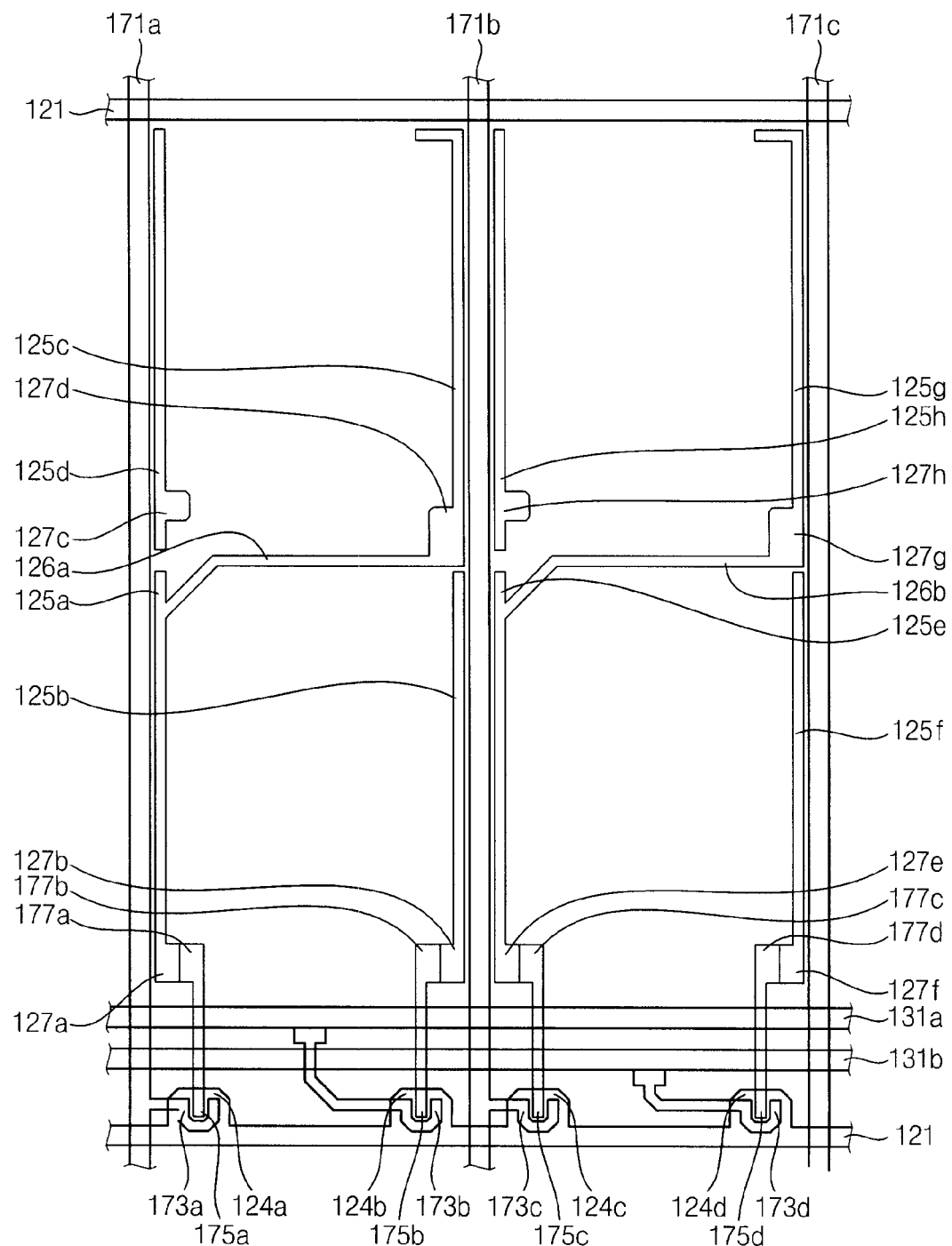
FIG. 11A and FIG. 11B are respectively a plan view and a cross-sectional view showing a method of manufacturing first and second data lines of the display substrate of FIG. 1.
Figure 11B:
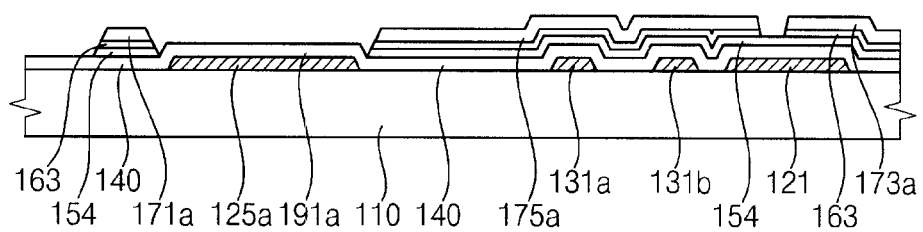

FIG. 11A and FIG. 11B are respectively a plan view and a cross-sectional view showing a method of manufacturing first and second data lines of the display substrate of FIG. 1.

Referring to FIG. 3, FIG. 10A, FIG. 10B, FIG. 11A and FIG. 11B, the semiconductor layer 154 and the ohmic contact layer 163 can be formed, and the first, second and third data lines 171a, 171b and 171c can be formed. The first data line 171a may be extended along the second direction DI2 adjacent to the first shield pattern 125a and the fourth shield pattern 125d. The second data line 171b may be extended along the second direction DI2 adjacent to the second and third shield patterns 125b and 125c at the first pixel area PX(n,n) and adjacent to the fifth and eighth shield patterns 125e and 125h at the second pixel area PX(n,n+1). The third data line 171c may be extended along the second direction DI2 adjacent to the sixth and seventh shield patterns 125f and 125g.

In some examples, a first source electrode 173a, a second source electrode 173b, a third source electrode 173c, a fourth source electrode 173d, a first drain electrode 175a, a second drain electrode 175b, a third drain electrode 175c and a fourth drain electrode 175d of the first to fourth switching elements Qa, Qb, Qc and Qd can be formed. For example, a first drain contact electrode 177a, a second drain contact electrode 177b, a third drain contact electrode 177c and a fourth drain contact electrode 177d can be formed, which may respectively be extended from the first to fourth drain electrodes 175a, 177b, 177c and 177d.

For example, the semiconductor layer 154, the ohmic contact layer 163 and the data metallic layer may simultaneously be etched.

Figure 12A:
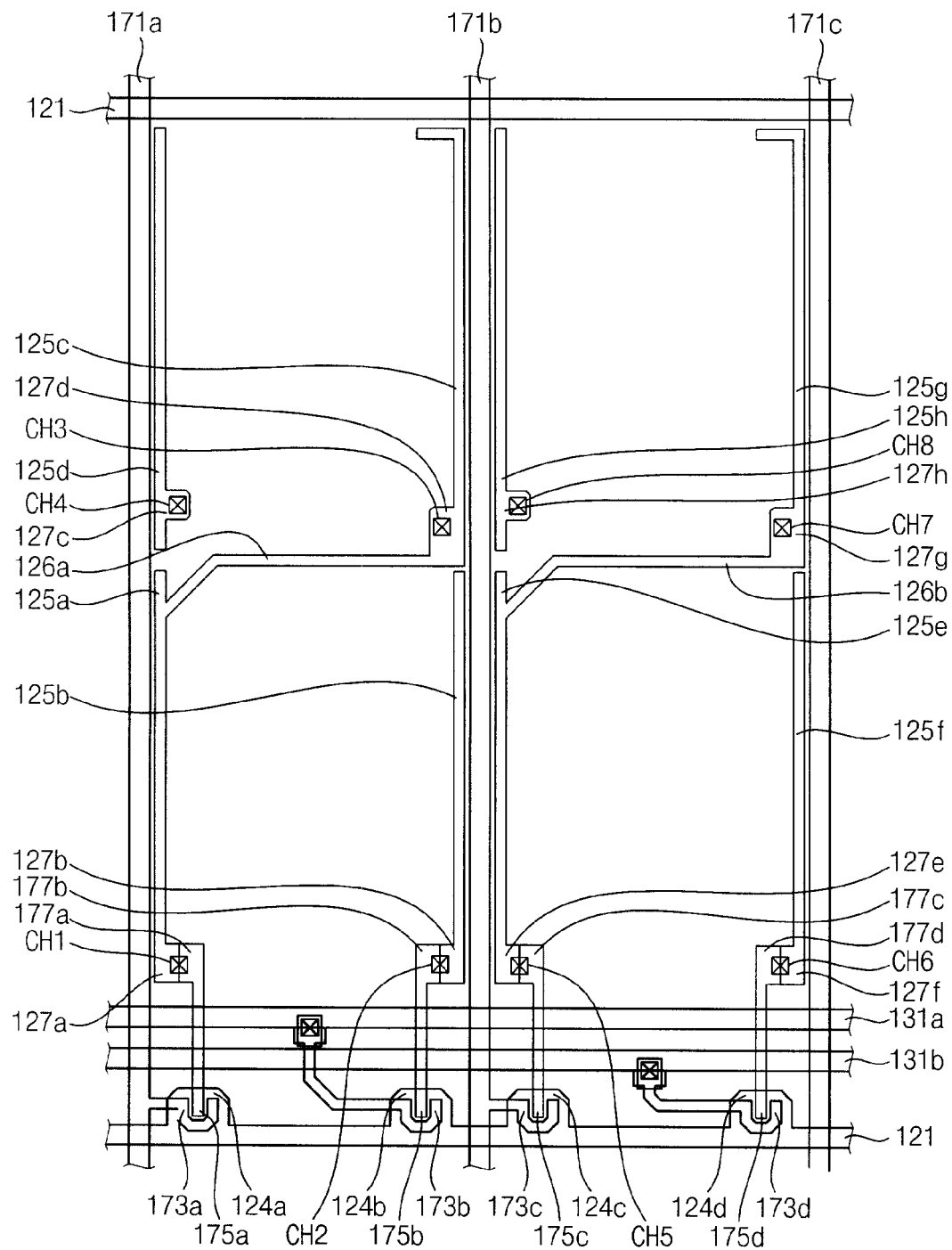
FIG. 12A and FIG. 12B are respectively a plan view and a cross-sectional view showing a method of manufacturing from first to eighth contact holes of the display substrate of FIG. 1.
Figure 12B:
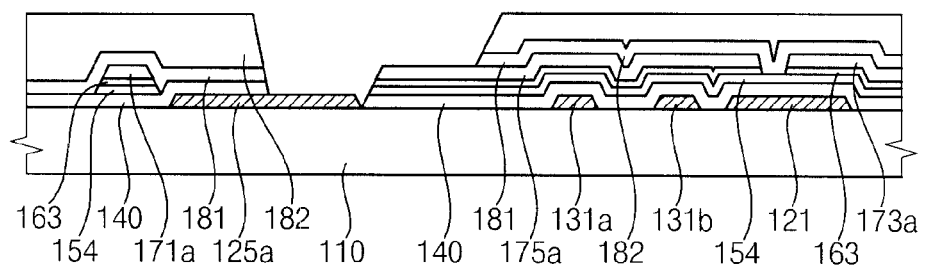

FIG. 12A and FIG. 12B are respectively a plan view and a cross-sectional view showing a method of manufacturing from first to eighth contact holes of the display substrate of FIG. 1.

Referring to FIG. 1, FIG. 3, FIG. 10A, FIG. 10B, FIG. 11A, FIG. 11B, FIG. 12A and FIG. 12B, the data insulation layer 180 (which may include an inorganic insulation layer 181 and an organic insulation layer 182) can be formed, and the first to eighth contact holes CH1, CH2, CH3, CH4, CH5, CH6, CH7 and CH8 can be formed through the data insulation layer 180. The first contact hole CH1 can contact with the first pixel electrodes 191a and the first shield pattern 125a, and the second contact hole CH2 can contact with the second pixel electrodes 191b and the second shield pattern 125b. The third contact hole CH3 can contact with the second pixel electrodes 191b and the third shield pattern 125c, and the fourth contact hole CH4 can contact with the first pixel electrodes 191a and the fourth shield pattern 125d. The fifth contact hole CH5 can contact with the third pixel electrodes 191c and the fifth shield pattern 125e, and the sixth contact hole CH6 can contact with the fourth pixel electrodes 191d and the sixth shield pattern 125f. The seventh contact hole CH7 can contact with the fourth pixel electrodes 191d and the seventh shield pattern 125g, and the eighth contact hole CH8 can contact with the third pixel electrodes 191c and the eighth shield pattern 125h.

For example, the gate insulation layer 140 formed on the gate metal layer and the data insulation layer 180 formed on the data metal layer may simultaneously be etched.

Referring to FIG. 3 and FIG. 4, a method of forming the first transparent electrode 191 is described. The second and third transparent electrodes 491 and 591 may substantially be same as the first transparent electrode 191 except the second and third transparent electrodes 491 and 591 may be overlapped with the first and second data lines 171a and 171b, and thus a method of forming the second and third transparent electrode 491 and 591 may be hereinafter be omitted to avoid unnecessarily obscuring the present invention.

The first and third pixel electrodes 191a and 191c and the second and fourth pixel electrodes 191b and 191d can be formed on the lower base substrate 110 through which the first to fourth contact holes CH1, CH2, CH3 and CH4 can be formed.

The first pixel electrode 191a can contact with the first shield contact electrode 127a and the first drain contact electrode 177a on the lower base substrate 110 through which the first contact hole CH1 can be formed, and can contact with the third shield contact electrode 127c on the lower base substrate 110 through which the third contact hole CH3 can be formed. The second pixel electrode 191b can contact with the second shield contact electrode 127b and the second drain contact electrode 177b on the lower base substrate 110 through which the second contact hole CH2 can be formed, and can contact with the fourth shield contact electrode 127d on the lower base substrate 110 through which the fourth contact hole CH4 can be formed.

The third pixel electrode 191c can contact with the fifth shield contact electrode 127e and the third drain contact electrode 177c on the lower base substrate 110 through which the fifth contact hole CH5 can be formed, and can contact with the seventh shield contact electrode 127g on the lower base substrate 110 through which the seventh contact hole CH7 can be formed. The fourth pixel electrode 191d can contact with the sixth shield contact electrode 127e and the fourth drain contact electrode 177d on the lower base substrate 110 through which the sixth contact hole CH6 can be formed, and can contact with the eighth shield contact electrode 127h on the lower base substrate 110 through which the eighth contact hole CH8 can be formed.

For example, the first and third shield patterns 125a and 125c can cover a first terminal of the first pixel electrode 191a and a second terminal of the first pixel electrode 191a, respectively, and the second and fourth shield patterns 125b and 125d can cover a first terminal of the second pixel electrode 191b and a second terminal of the second pixel electrode 191b, respectively.

The fifth and seventh shield patterns 125e and 125g can cover a first terminal of the third pixel electrode 191c and a second terminal of the third pixel electrode 191c, respectively, and the sixth and eighth shield patterns 125f and 125h can cover a first terminal of the fourth pixel electrode 191d and a second terminal of the fourth pixel electrode 191d, respectively.

In some examples, a storage line may not be existed, and the first power line 131a and the second power line 131b may be overlapped with each other to form a plurality of storage capacitors. Thus, an aperture ratio of the display substrate may be enhanced.

In some examples, when a voltage applied to the second pixel electrode 191b is equal to a voltage applied to the first pixel electrode 191a in the first pixel area PX(n,n), a horizontal electric field may be removed, which can be generated between the second data line 171b and the first pixel electrode 191a due to a voltage of the different polarity applied to the second data line 171b. For example, when a voltage applied to the second pixel electrode 191b is equal to a voltage applied to the first pixel electrode 191a and a frame is changed in the first pixel area PX(n,n), an electric field may be removed, which can instantly be generated between the first data line 171a and the first pixel electrode 191a due to a voltage of the different polarity applied to the first data line 171a. Thus, light leakage, which can be occurred by a horizontal electric field associated with a black image, can be prevented.

In some examples, when a voltage applied to the fourth pixel electrode 191d is equal to a voltage applied to the third pixel electrode 191c in the second pixel area PX(n,n+1), a horizontal electric field may be removed, which can be generated between the third data line 171c and the third pixel electrode 191c due to a voltage of the different polarity applied to the third data line 171c. For example, when a voltage applied to the fourth pixel electrode 191d is equal to a voltage applied to the third pixel electrode 191c and a frame is changed in the second pixel area PX(n,n+1), an electric field may be removed, which can instantly be generated between the second data line 171b and the third pixel electrode 191c due to a voltage of the different polarity applied to the second data line 171b. Thus, light leakage, which can be occurred by a horizontal electric field associated with a black image, can be prevented.

In some examples, the first to fourth shield patterns 125a, 125b, 125c and 125d receiving the same voltage applied to the first and second pixel electrodes 191a and 191b can be formed to overlap with the first and second pixel electrodes 191a and 191b so that the first to fourth shield patterns 125a, 125b, 125c and 125d are adjacent to the first and second data lines 171a and 171b. In addition, the fifth to eighth shield patterns 125e, 125f, 125g and 125h receiving the same voltage applied to the third and fourth pixel electrodes 191c and 191d can partially be overlapped with the third and fourth pixel electrodes 191c and 191d. Thus, a horizontal electric field may be prevented, which can be generated between the first to third data lines 171a, 171b and 171c and the first to fourth pixel electrodes 191a, 191b, 191c and 191d. Therefore, when the display panel is in a black state, light leakage may be prevented. For example, since the first to third transparent electrodes 191, 491 and 591 may partially be overlapped with the first to eighth shield patterns 125a, 125b, 125c, 125d, 125e, 125f, 125g and 125h, light leakage may be more effectively prevented when the display panel is in a black state.

In addition, light leakage, which can be occurred at areas of the display panel 1000, can effectively be reduced.

Since the different polarity voltage being different from that of the pixel area P can be applied from an upper portion of the display panel 1000 every frame, light leakage generated at the first pixel area PX(n,n) of the second area A2 may be great, and light leakage generated at the second pixel area PX(n,n+1) of the third area A3 may be great. Thus, a width of a transparent electrode may gradually be decreased or increased as it may go from an upper portion of the display panel 1000 to a lower portion of the display panel 1000 so that light leakage may effectively be decreased, which can be occurred at an area of the display panel 1000.

Figure 13:
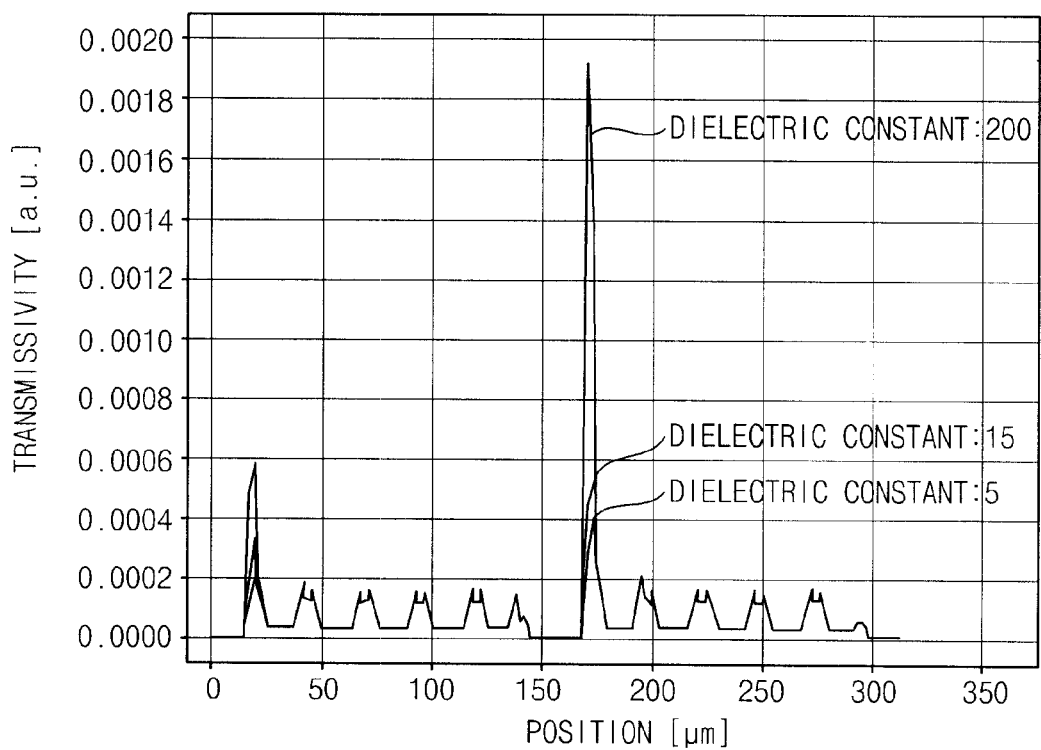
FIG. 13 is a graph showing transmissivity in accordance with permittivity of a light-blocking pattern of FIG. 4.

FIG. 13 is a graph showing transmissivity in accordance with a dielectric constant of a light-blocking pattern of FIG. 4. For example, X-axis may represent a position (μm) of the light-blocking pattern along an extending direction of a gate line of a display panel, and Y-axis may represent a transmissivity (a.u.) of the light-blocking pattern.

Referring to FIG. 4 and FIG. 13, when a dielectric constant of the light-blocking pattern 220 is about 200, it may be recognized that light leakage may greatly be generated when a position of a light-blocking pattern along an extending direction of a gate line is about 20 μm and about 175 μm, respectively. For example, when a position of a light-blocking pattern along an extending direction of a gate line is about 20 μm, a transmissivity of the light-blocking pattern 220 may be about 0.0006 [a.u.]. When a position of a light-blocking pattern along an extending direction of a gate line is about 175 μm, a transmissivity of the light-blocking pattern 220 may be about 0.0019 [a.u.].

In a case that permittivity of the light-blocking pattern 220 is about 15, it may be recognized that light leakage can greatly be generated when a position of a light-blocking pattern along an extending direction of a gate line is about 20 μm and about 175 μm, respectively. For example, when a position of a light-blocking pattern along an extending direction of a gate line is about 20 μm, transmissivity of the light-blocking pattern 220 may be about 0.0003 [a.u.]. When a position of a light-blocking pattern along an extending direction of a gate line is about 175 μm, transmissivity of the light-blocking pattern 220 may be about 0.0005 [a.u.].

In a case that a dielectric constant of the light-blocking pattern 220 is about 5, it may be recognized that light leakage can greatly be generated when a position of a light-blocking pattern along an extending direction of a gate line is about 20 μm and about 175 μm, respectively. For example, when a position of a light-blocking pattern along an extending direction of a gate line is about 20 μm, transmissivity of the light-blocking pattern 220 may be about 0.0002 [a.u.]. When a position of a light-blocking pattern along an extending direction of a gate line is about 175 μm, transmissivity of the light-blocking pattern 220 may be about 0.0004 [a.u.].

That is, in a case that a position of the light-blocking pattern 220 along an extending directon of a gate line is about 175 μm, it may be recognized that light leakage, which can be occurred when a dielectric constant of the light-blocking pattern 220 is about 200, may be about 3.8 times greater than that of the light leakage, which may be occurred when a dielectric constant of the light-blocking pattern 220 is about 15.

For example, about 20 μm position and about 175 μm position that may be positions along an extending direction of the gate line may adjacent to the data lines.

Figure 14:
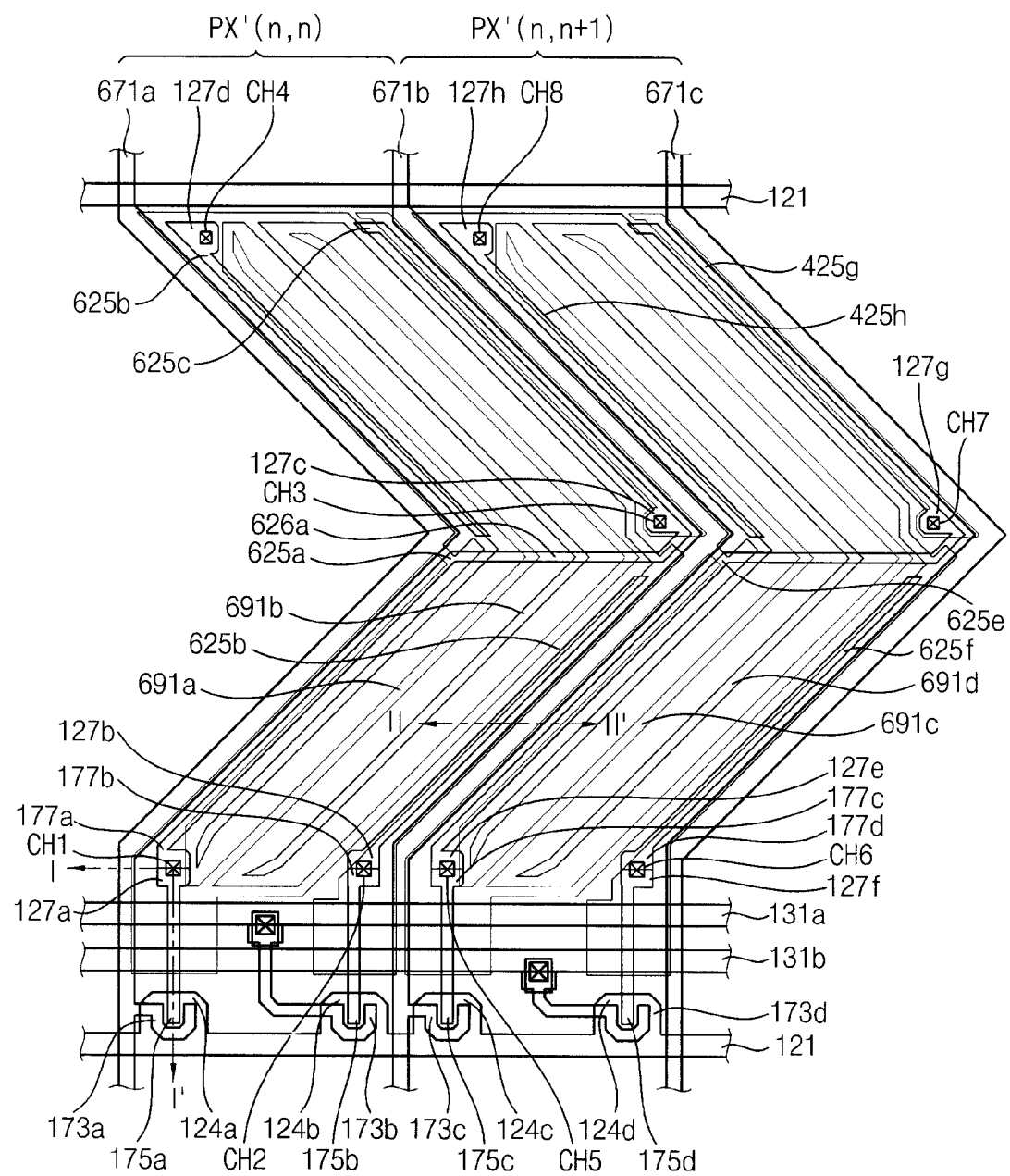
FIG. 14, FIG. 15 and FIG. 16 are plan views showing a first area, a second area and a third area of a display panel according to exemplary embodiments of the present invention.
Figure 15:
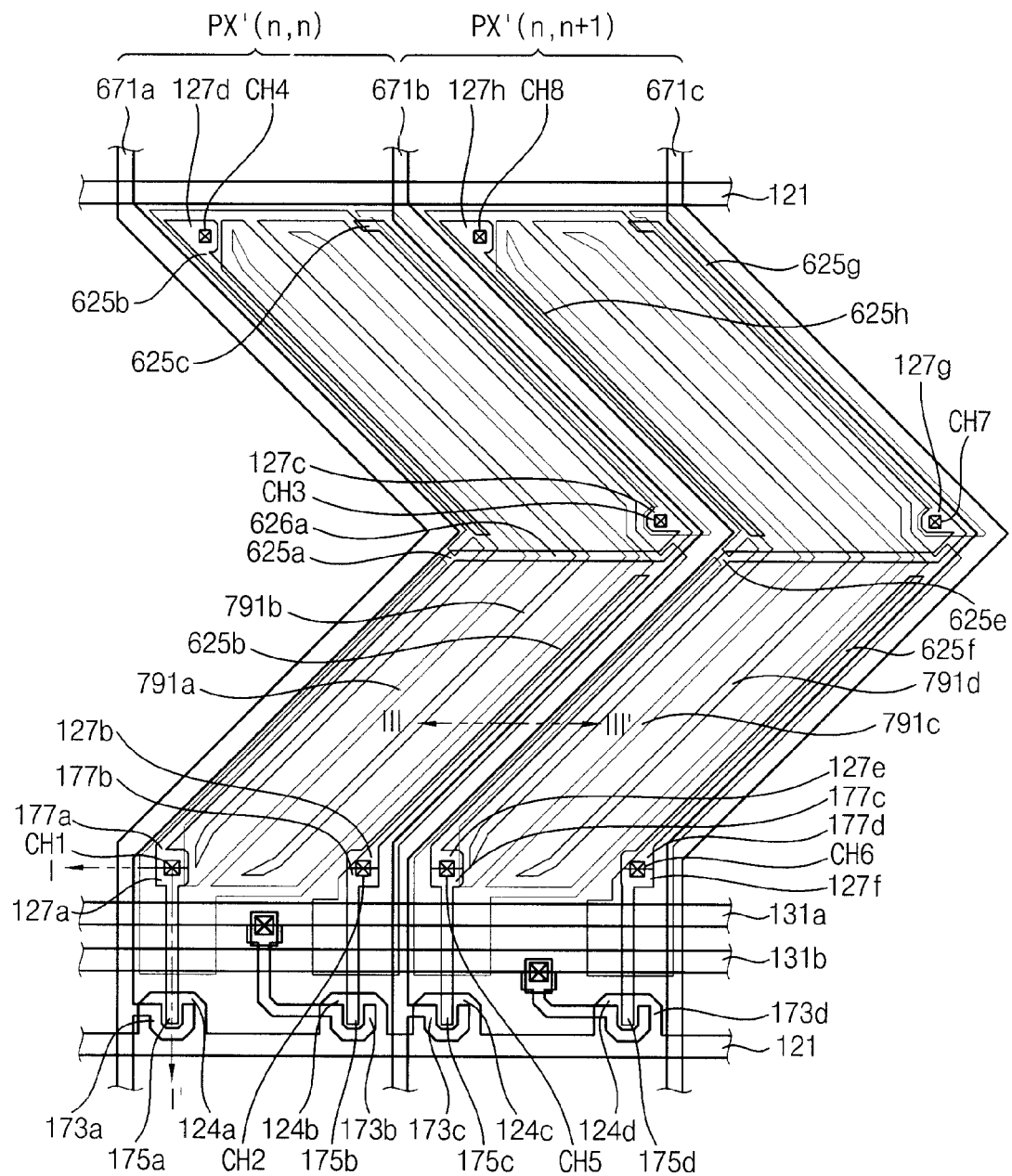
Figure 16:
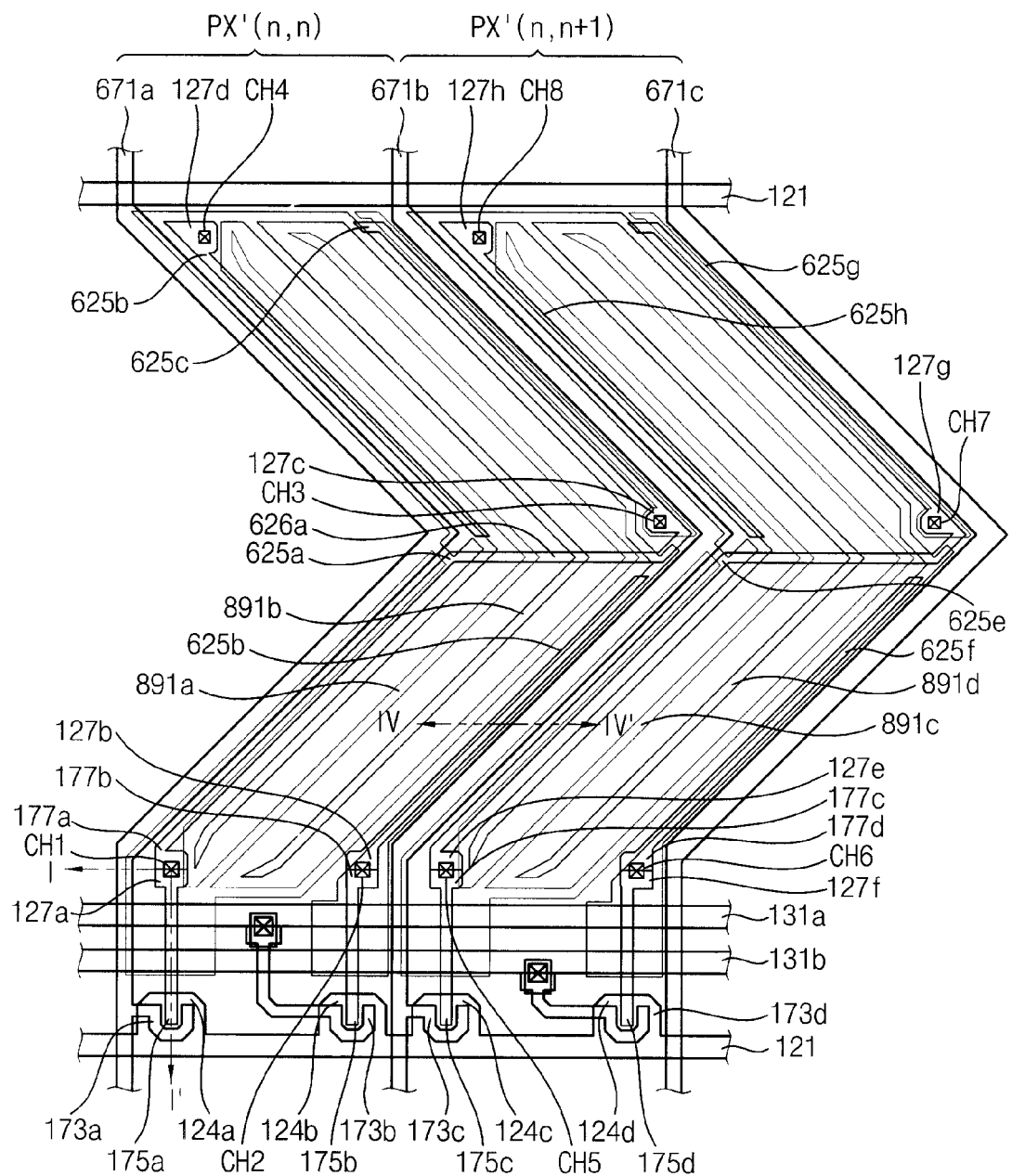

Thus, when a dielectric constant of the light-blocking pattern 220 is no more than about 15, light leakage which may be generated at an area adjacent to the data lines may be minimized FIG. 14, FIG. 15 and FIG. 16 are plan views showing a first area, a second area and a third area of a display panel according to exemplary embodiments of the present invention.

A plan view of the display device may substantially be the same as the plan view of FIG. 1 except that the display device may include a display substrate 600 replacing the display substrate 100 of the previous example embodiment of FIG. 1, and thus any repetitive detailed explanation may hereinafter may be omitted to avoid unnecessarily obscuring the present invention.

A cross-sectional view taken along a line I-I' of FIG. 14 and a cross-sectional view taken along a line II-II' of FIG. 14 may be substantially be the same as cross-sectional views described with reference to FIGS. 4 and 5, respectively. A cross-sectional view taken along a line I-I' of FIG. 15 and a cross-sectional view taken along a line of FIG. 15 may substantially be the same as cross-sectional views described with reference to FIG. 4 and FIG. 7, respectively. A cross-sectional view taken along a line I-I' of FIG. 16 and a cross-sectional view taken along a line IV-IV' of FIG. 16 may substantially be the same as cross-sectional views described with reference to FIG. 4 and FIG. 9, respectively. Thus, the same reference numerals can be used to refer to the same or like parts as those described in FIG. 4, FIG. 5, FIG. 7 and FIG. 9, and any repetitive detailed explanation concerning the above elements may be omitted to avoid unnecessarily obscuring the present invention.

Referring to FIG. 1, FIG. 4, FIG. 5 and FIG. 14, the display substrate 600 may include from fourth to sixth data lines 671a, 671b and 671c having a V-shape and from first to eighth shield patterns 625a, 625b, 625c, 625d, 625e, 625f, 625g and 625h instead of the first to third data lines 171a, 171b and 171c having a stripe shape and the first to eighth shield patterns 125a, 125b, 125c, 125d, 125e, 125f, 125g and 125h.

In some examples, the display substrate 600 may include a fourth transparent electrode 691 including first and third pixel electrodes 691a and 691c parallel with from the fourth to sixth data lines 671a, 671b and 671c and second and fourth pixel electrodes 691b and 691d instead of the first transparent electrode 191 including the first and third pixel electrodes 191a and 191c and the second and fourth pixel electrodes 191b and 191d.

For example, the first and third pixel electrodes 691a and 691c can respectively be connected to the first and third switching elements Qa and Qc to respectively be extended toward upper portions of the third and fourth pixel areas PX'(n,n) and PX'(n,n+1) in a diagonal direction parallel with the fourth to sixth data lines 671a, 671b and 671c. In this example, the first and third pixel electrodes 691a and 691c can respectively be extended in a horizontal direction at lower portions of the third pixel area PX'(n,n) and the fourth pixel area PX'(n,n), and the first and third pixel electrodes 691a and 691c can be extended in a horizontal direction that can be extended toward upper portions of the third and fourth pixel areas PX'(n,n) and PX'(n,n+1) in a diagonal direction.

The second and fourth pixel electrodes 691b and 691d can respectively be connected to the second and fourth switching elements Qb and Qd to be extended toward upper portions of the third and fourth pixel areas PX'(n,n) and PX'(n,n+1) in a diagonal direction parallel with the fourth to sixth data lines 671a, 671b and 671c. In this example, the second and fourth pixel electrodes 691b and 691d can respectively be extended in a horizontal direction at upper portions of the third pixel area PX'(n,n) and the fourth pixel area PX'(n,n), and the second and fourth pixel electrodes 691b and 691d can be extended in the horizontal direction that can be extended toward lower portions of the third and fourth pixel areas PX'(n,n) and PX'(n,n+1) in a diagonal direction.

In this example, the first pixel electrode 691a can be formed adjacent to the fourth data line 671a on a lower portion of the third pixel area PX'(n,n), and the second pixel electrode 691b can be formed adjacent to the fifth data line 671b on the lower portion of the third pixel area PX'(n,n). For example, the second pixel electrode 691b can be formed adjacent to the fourth data line 671a on an upper portion of the third pixel area PX'(n,n), and the first pixel electrode 691a can be formed adjacent to the fifth data line 671b on the upper portion of the third pixel area PX'(n,n).

Similarly, the third pixel electrode 691c can be formed adjacent to the fifth data line 671b on a lower portion of the fourth pixel area PX'(n,n+1), and the fourth pixel electrode 691d can be formed adjacent to the sixth data line 671c on the lower portion of the fourth pixel area PX'(n,n+1). For example, the fourth pixel electrode 691d can be formed adjacent to the fifth data line 671b on an upper portion of the fourth pixel area PX'(n,n+1), and the third pixel electrode 691c can be formed adjacent to the sixth data line 671c on the upper portion of the fourth pixel area PX'(n,n+1).

In this example, the first pixel electrode 691a can partially be overlapped with each of the first shield pattern 625a and the fourth data line 671a, and can partially be overlapped with each of the third shield pattern 625c and the fifth data line 671b.

The second pixel electrode 691b can partially be overlapped with the second shield pattern 625b and the fifth data line 671b, respectively, and can partially be overlapped with the fourth shield pattern 625d and the fourth data line 671a, respectively.

The third pixel electrode 691c can partially be overlapped with the fifth shield pattern 625e and the fifth data line 671b, respectively, and can partially be overlapped with the seventh shield pattern 625g and the sixth data line 671c, respectively.

The fourth pixel electrode 691d can partially be overlapped with the sixth shield pattern 625f and the sixth data line 671c, respectively, and can partially be overlapped with the eighth shield pattern 625h and the fifth data line 671b, respectively.

Referring to FIG. 1, FIG. 4, FIG. 7 and FIG. 15, a fifth transparent electrode 791 may include a first pixel electrode 791a, a second pixel electrode 791b, a third pixel electrode 791c and a fourth pixel electrode 791d. A plan view of the display panel corresponding to a second area may substantially be the same as FIG. 14 except a shape of the fifth transparent electrode 791. Thus, identical reference numerals are used in FIG. 15 to refer to components that are the same or like those shown in FIG. 14, and thus, a detailed description thereof may be omitted to avoid unnecessarily obscuring the present invention.

The first pixel electrode 791a may substantially be the same as the first pixel electrode 691a of FIG. 14 except that the first pixel electrode 791a may not be overlapped with the fourth data line 671a and is only overlapped with the fifth data line 671b.

The second pixel electrode 791*b* may substantially be the same as the second pixel electrode 691*b* of FIG. 14 except that the second pixel electrode 791*b* may not be overlapped with the fourth data line 671*a* and may be overlapped with the fifth data line 671*b*.

The third pixel electrode 791*c* may substantially be the same as the third pixel electrode 691*c* of FIG. 14 except that the third pixel electrode 791*c* may not be overlapped with the fifth data line 671*b* and may only be overlapped with the sixth data line 671*c*.

The fourth pixel electrode 791*d* may substantially be the same as the fourth pixel electrode 691*d* of FIG. 14 except that the fourth pixel electrode 791*d* may not be overlapped with the fifth data line 671*b* and may only be overlapped with the sixth data line 671*c*.

Referring to FIG. 1, FIG. 4, FIG. 9 and FIG. 16, a sixteenth transparent electrode 891 may include a first pixel electrode 891*a*, a second pixel electrode 891*b*, a third pixel electrode 891*c* and a fourth pixel electrode 891*d*. A plan view of the display panel corresponding to a third area according to the present example embodiment may substantially be the same as FIG. 14 except a shape of the sixth transparent electrode 891. Thus, identical reference numerals are used in FIG. 16 to refer to components that are the same or like those shown in FIG. 14, and thus, a detailed description thereof may be omitted to avoid unnecessarily obscuring the present invention.

The first pixel electrode 891*a* may substantially be the same as the first pixel electrode 691*a* of FIG. 14 except that the first pixel electrode 891*a* may not be overlapped with the fifth data line 671*a* and may be overlapped with the fourth data line 671*a*.

The second pixel electrode 891*b* may substantially be the same as the second pixel electrode 691*b* of FIG. 14 except that the second pixel electrode 891*b* may not be overlapped with the fifth data line 671*a* and may be overlapped with the fourth data line 671*a*.

The third pixel electrode 891*c* may substantially be the same as the third pixel electrode 691*c* of FIG. 14 except that the third pixel electrode 891*c* may not overlapped with the sixth data line 671*b* and may be overlapped with the fifth data line 671*b*.

The fourth pixel electrode 891*d* may substantially be the same as the fourth pixel electrode 691*d* of FIG. 14 except that the fourth pixel electrode 891*d* may not be overlapped with the sixth data line 671*b* and may be overlapped with the fifth data line 671*b*.

Figure 17:
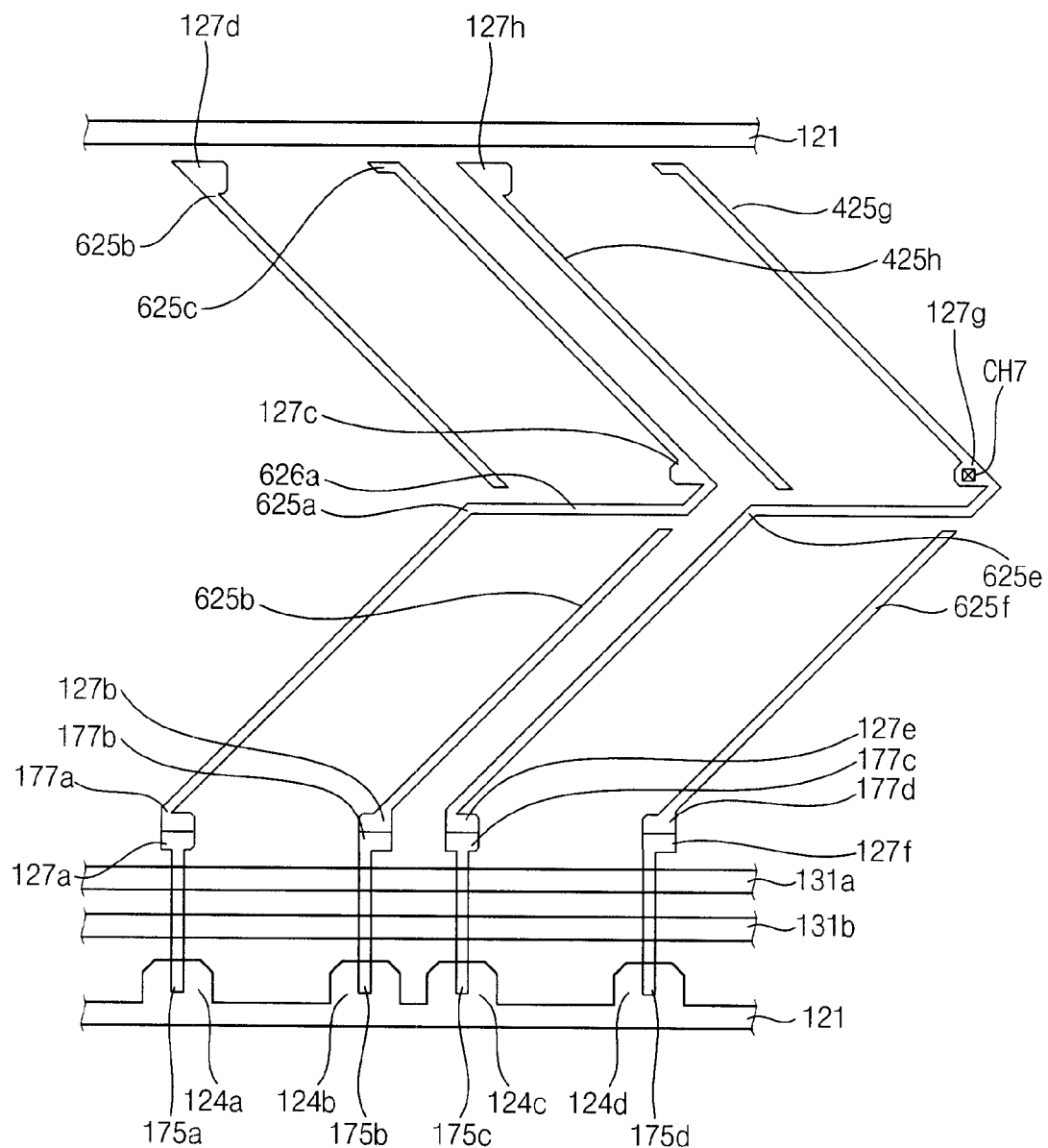
FIG. 17 is a plan view showing a method of manufacturing a gate line, first and second power lines and from first shield pattern to eighth shield pattern of a display substrate, according to exemplary embodiments of the present invention.

FIG. 17 is a respectively a plan view showing a method of manufacturing a gate line, first and second power lines and from first to eighth shield patterns of a display substrate according to exemplary embodiments of the present invention.

A cross-sectional view taken along a line I-I' of FIG. 14, FIG. 15 and FIG. 16 for explaining a method of forming the gate line, the first and second power lines and the first to eighth shield patterns may substantially be the same as the cross-sectional view of FIG. 10B, and thus it will be omitted to avoid unnecessarily obscuring the present invention.

Referring to FIG. 10B and FIG. 17, the first to eighth shield patterns 625*a*, 625*b*, 625*c*, 625*d*, 625*e*, 625*f*, 625*g* and 625*h*, the connection pattern 626*a*, and the first to eighth shield contact electrodes 627*a*, 627*b*, 627*c*, 627*d*, 627*e*, 627*f*, 627*g* and 627*h* can be formed and extended from the first to eighth shield patterns 625*a*, 625*b*, 625*c*, 625*d*, 625*e*, 625*f*, 625*g* and 625*h*.

In this example, the first, second, fifth and sixth shield patterns 625*a*, 625*b*, 625*e* and 625*f* can be formed with an inclined angle of about 45 degrees with respect to an extending direction of the gate line 121. Fore example, the third, fourth, seventh and eighth shield patterns 625*c*, 625*d*, 625*g* and 625*h* can be formed with an inclined angle of about 135 degrees with respect to the extending direction of the gate line 121.

The first shield pattern 625*a* and the second shield pattern 625*b* may be opposite to each other, and the third shield pattern 625*c* and the fourth shield pattern 625*d* may be opposite to each other. Similarly, the fifth shield pattern 625*e* and the sixth shield pattern 625*f* may be opposite to each other, and the seventh shield pattern 625*g* and the eighth shield pattern 625*h* may be opposite to each other.

Figure 18:
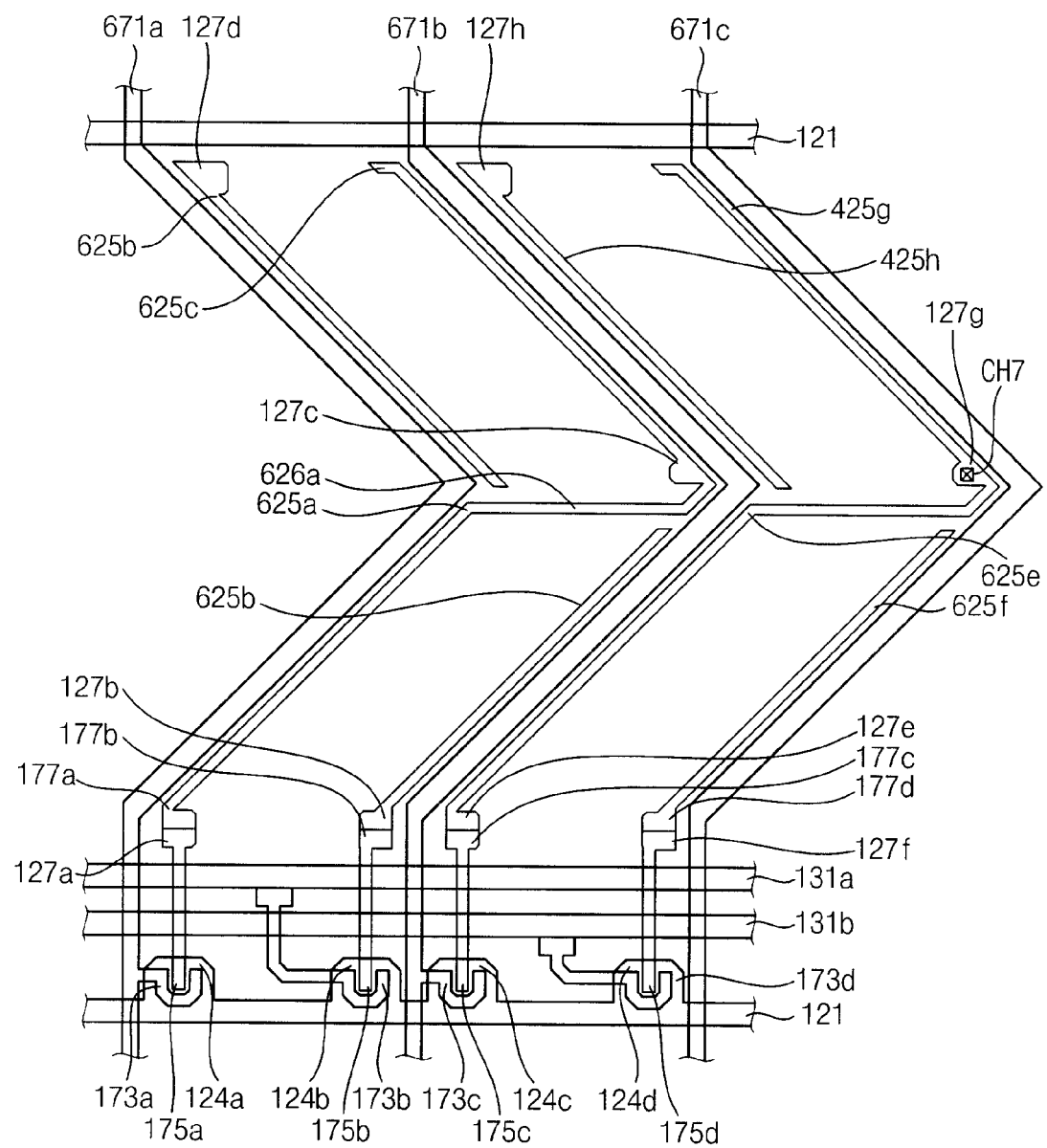
FIG. 18 is a plan view showing a method of forming first and second data lines of a display substrate of FIG. 17.

FIG. 18 is a plan view showing a method of forming first and second data lines of a display substrate of FIG. 17.

A cross-sectional view taken along a line I-I' of FIG. 14, FIG. 15 and FIG. 16 for explaining a method of forming the first and second data lines may substantially be the same as the cross-sectional view of FIG. 11B, and thus it will be omitted to avoid unnecessarily obscuring the present invention.

Referring to FIGS. 11B and 18, a semiconductor layer 154 and an ohmic contact layer 163 can be formed, and the fourth, fifth and sixth data lines 671*a*, 671*b* and 671*c* can be formed. The fourth data line 671*a* can be extended adjacent to the first shield pattern 625*a* and the fourth shield pattern 625*d*. The fifth data line 671*b* can be extended adjacent to the second and third shield patterns 625*b* and 625*c* at the first pixel area PX(n,n) and adjacent to the fifth and eighth shield patterns 625*e* and 625*h* at the second pixel area PX(n,n+1). The sixth data line 671*c* can be extended adjacent to the sixth and seventh shield patterns 625*f* and 625*g*.

Figure 19:
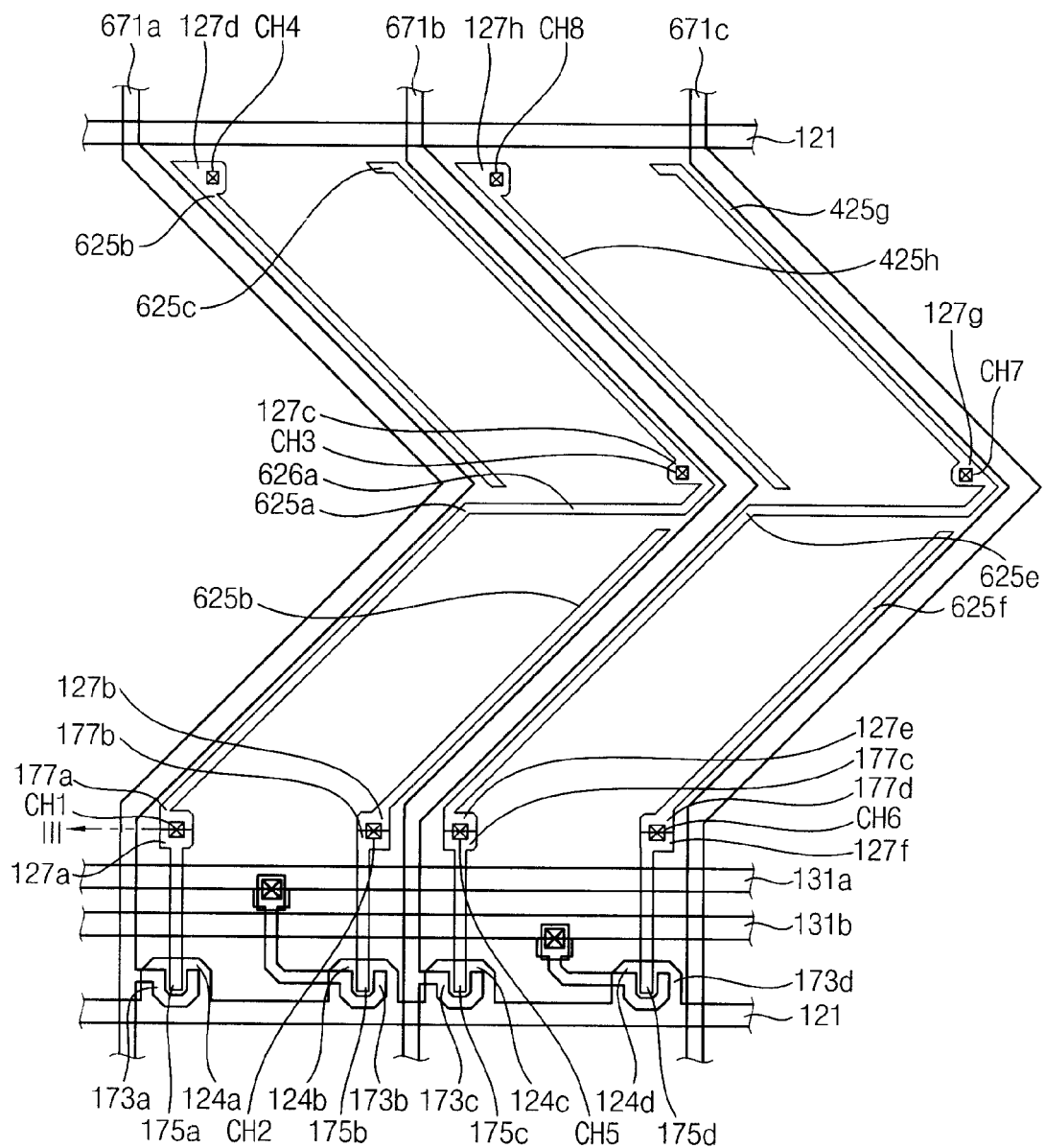
FIG. 19 is a plan view showing a method of forming from first to eighth contact holes of a display substrate.

FIG. 19 is a plan view showing a method of forming from first to eighth contact holes of a display substrate.

A cross-sectional view taken along a line I-I' of FIG. 14, FIG. 15 and FIG. 16 for explaining a method of forming the first to eighth contact holes may substantially be the same as the cross-sectional view of FIG. 12B, and thus it will be omitted to avoid unnecessarily obscuring the present invention.

Referring to FIG. 12B and FIG. 19, the data insulation layer 180 (which may include an inorganic insulation layer 181 and an organic insulation layer 182) can be formed, and the first to eighth contact holes CH1, CH2, CH3, CH4, CH5, CH6, CH7 and CH8 can be formed through the data insulation layer 180. The first contact hole CH1 can contact with the first pixel electrodes 191*a* and the first shield pattern 125*a*, and the second contact hole CH2 can contact with the second pixel electrodes 191*b* and the second shield pattern 125*b*. The third contact hole CH3 can contact with the second pixel electrodes 191*b* and the third shield pattern 125*c*, and the fourth contact hole CH4 can contact with the first pixel electrodes 191*a* and the fourth shield pattern 125*d*. The fifth contact hole CH5 can contact with the third pixel electrodes 191*c* and the fifth shield pattern 125*e*, and the sixth contact hole CH6 can contact with the fourth pixel electrodes 191*d* and the sixth shield pattern 125*f*. The seventh contact hole CH7 can contact with the fourth pixel electrodes 191*d* and the seventh shield pattern 125*g*, and the eighth contact hole CH8 can contact with the third pixel electrodes 191*c* and the eighth shield pattern 125*h*.

Referring to FIG. 4 and FIG. 14, a method of forming the fourth transparent electrode 691 is described. The fifth and sixth transparent electrodes 791 and 891 may substantially be the same as the fourth transparent electrode 691 except the fifth and sixth transparent electrodes 791 and 891 may be overlapped with the fourth and fifth data lines 671*a* and 671*b*, and thus a method of forming the fifth and sixth transparent electrode 791 and 891 hereinafter may be omitted to avoid unnecessarily obscuring the present invention.

For example, a method of forming the fourth transparent electrode 691 may substantially be the same as the method of forming the first transparent electrode 191 described with reference to FIG. 3 and FIG. 4 except that the fourth transparent electrode 691 having plurality of V-shaped electrode bars, and thus a method of forming the fourth transparent electrode 191 may hereinafter be omitted to avoid unnecessarily obscuring the present invention.

For example, a transmissivity associated with a dielectric constant of a light-blocking pattern may substantially be the same as transmissivity of FIG. 13 except that the fourth transparent electrode 691 of the display substrate 600 having plurality of V-shaped electrode bars, and thus it may hereinafter be omitted to avoid unnecessarily obscuring the present invention.

According to exemplary embodiments of the present example embodiment, a shape of the pixel area P including the third pixel area PX'(n,n) and the fourth pixel area PX'(n, n+1) can be arranged in a zigzag shape to define a matrix shape so that a viewing angle of the display panel may be enhanced.

According to exemplary embodiments of the present invention, shield patterns receiving the same voltage applied to the first and second pixel electrodes of a display substrate can be formed to overlap with the first and second pixel electrodes, and the shield patterns can be formed adjacent to the data line. Since the first and second pixel electrodes may partially be overlapped with the data line so that horizontal electric fields may be prevented, which can be occurred between the first pixel electrode and the data line and between the second pixel electrode and the data line when a black image is displayed. In this regard, a light leakage may be prevented.

According to exemplary embodiments of the present invention, a display substrate may include a first shield pattern, a second shield pattern and a transparent electrode. The first shield pattern may adjacent to a first data line. The second shield pattern may adjacent to a second data line facing the first data line. The transparent electrode may include a first pixel electrode electrically connected to the first data line and the first shield pattern, and a second pixel electrode electrically connected to a first power line and the second shield pattern. The first pixel electrode and the second pixel electrode can be disposed in an alternating arrangement. The transparent electrode may partially be overlapped with at least one of the first data line and the second data line.

In some exemplary embodiments of the present invention, the display substrate may further include a plurality of gate lines divided into from first block to K-th block (wherein, 'K' is an odd number). For example, a first width in which the transparent electrodes of the different blocks may be overlapped with the second data line that may be different from each other, and a second width in which the transparent electrodes of the different blocks may be overlapped with the first data lines that may be different from each other.

In some example embodiments of the present invention, a transparent electrode of the first block may partially overlap with the second data line, a transparent electrode of a (K+1) 2-th block may partially overlap with the first and second data lines, and a transparent electrode of the K-th block may partially overlap with the first data line.

In some exemplary embodiments of the present invention, the first width in which the transparent electrode may be overlapped with the second data line that may gradually be decreased as it may go from the first block to the K-th block.

In some exemplary embodiments of the present invention, the second width in which the transparent electrode may be overlapped with the first data line that may gradually be increased as it may go from the first block to the K-th block.

In some exemplary embodiments of the present invention, an interval distance between the transparent electrode and adjacent transparent electrode adjacent to the second data line may be uniform at each of the from first block to K-th block.

In some exemplary embodiments of the present invention, a sum of one width in which the transparent electrode may be overlapped with the second data line and the other width in which the adjacent transparent electrode may be overlapped with the second data line may uniformly be disposed at each of the first to K-th blocks.

In some exemplary embodiments of the present invention, the first shield pattern may cover a first terminal of the first pixel electrode, and the second shield pattern may cover a first terminal of the second pixel electrode.

In some exemplary embodiments of the present invention, the display substrate may further include a third shield pattern disposed adjacent to the second data line and a fourth shield pattern disposed adjacent to the first data line. The third shield pattern may cover a second terminal of the first pixel electrode. The fourth shield pattern may cover a second terminal of the second pixel electrode.

In some exemplary embodiments of the present invention, the display substrate may further include a plurality of gate lines divided into from first block to K-th block (wherein, 'K' is an odd number). For example, a first terminal of the transparent electrode, which may comprise a second terminal of the first pixel electrode and a first terminal of the second pixel electrode that may be formed in the first block, may partially overlap with the second data line. Two terminals of the transparent electrode, which may be formed in a (K+1)/2-th block, may partially overlap with the first and second data lines. A second terminal of the transparent electrode, which may comprise a first terminal of the first pixel electrode and a second terminal of the second pixel electrode that may be formed in the K-th block, may partially overlap with the first data line.

In some exemplary embodiments of the present invention, the first width, in which the transparent electrode may be overlapped with the second data line, may be gradually decreased as it may go from the first block to the K-th block.

In some exemplary embodiments of the present invention, the second width, in which the second terminal of the transparent electrode may be overlapped with the first data line, may gradually be increased as it may go from the first block to the K-th block.

Exemplary embodiments of the present invention disclose a method of manufacturing a display substrate. The method includes a gate line and a first power line extended in a first direction, and a first shield pattern may be extended in a second direction and a second shield pattern may facing the first shield pattern that may be formed on a base substrate. A first data line and a second data line may be formed. The first data line may be extended in the second direction adjacent to the first shield pattern. The second data line adjacent to the second shield pattern may face with the first data line. A transparent electrode may be formed partially being overlapped with at least one of the first data line or the second data line. The transparent electrode may include a first pixel electrode partially being overlapped with a first end portion of the first shield pattern to electrically be connected to the first shield pattern, the gate line and a first data line, and a second pixel electrode partially being overlapped with a first end portion of the second shield pattern and alternately being disposed with the first pixel electrode to electrically be connected to the gate line and the first power line.

In some exemplary embodiments of the present invention, a third shield pattern disposed adjacent to the second data line may further be formed, and a fourth shield pattern disposed adjacent to the first data line may further be formed. The third shield pattern may cover a second terminal of the first pixel electrode, and the fourth shield pattern may cover a second terminal of the second pixel electrode.

In some exemplary embodiments of the present invention, a first width, in which a first terminal of the transparent electrode may be overlapped with the second data line, may gradually be decreased as it may go from the first block to the K-th block, and a second width, in which a second terminal of the transparent electrode may be overlapped with the first data line, may gradually be increased as it may go from the first block to the K-th block.

Exemplary embodiments of the present invention disclose a display panel that may include a display substrate, an opposite substrate and a liquid crystal layer. The display substrate may include a first shield pattern, a second shield pattern and a transparent electrode. The first shield pattern is adjacent to a first data line. The second shield pattern is adjacent to a second data line facing the first data line. The transparent electrode may include a first pixel electrode electrically connected to the first data line and the first shield pattern, and a second pixel electrode electrically connected to a first power line and the second shield pattern. The first pixel electrode and the second pixel electrode may be disposed in an alternating arrangement. The transparent electrode may partially be overlapped with at least one of the first data line and the second data line. The opposite substrate may include a light-blocking pattern to be opposite to the display substrate. The liquid crystal layer may be interposed between the display substrate and the opposite substrate.

In some exemplary embodiments of the present invention, liquid crystal molecules of the liquid crystal layer may vertically be aligned when an electric field that may not be formed between the display substrate and the opposite substrate. A horizontal electric field may be formed by the first and second pixel electrodes to which the different voltages are applied.

In some exemplary embodiments of the present invention, a permittivity of the light-blocking pattern may be no less than about 15.

In some exemplary embodiments of the present invention, the display panel may further include a plurality of gate lines divided into from first block to K-th block (wherein, 'K' is an odd number). First width, in which the transparent electrodes of the different blocks may be overlapped with the second data line, may be different from each other, and second width in which the transparent electrodes of the different blocks are overlapped with the first data lines, may be different from each other.

In some exemplary embodiments of the present invention, a transparent electrode of the first block may partially overlap with the second data line, a transparent electrode of a (K+1) 2-th block may partially overlap with the first and second data lines, and a transparent electrode of the K-th block may partially overlap with the first data line.

In some example embodiments of the present invention, shield patterns receiving the same voltage applied to the first and second pixel electrodes may be formed to overlap with the first and second pixel electrodes, and the first and second pixel electrodes may partially be overlapped with the data line so that horizontal electric fields may be prevented, which may be occurred between the first pixel electrode and the data line and between the second pixel electrode and the data line when a black image is displayed. Thus, light leakage may be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display substrate, comprising:
a plurality of gate lines divided into first to K-th blocks, K being an odd number;
a first shield pattern disposed adjacent to a first data line;
a second shield pattern disposed adjacent to a second data line facing the first data line,
wherein each block comprises:
a transparent electrode comprising a first pixel electrode coupled to the first data line and the first shield pattern, and a second pixel electrode coupled to a first power line and the second shield pattern, wherein the first pixel electrode and the second pixel electrode are disposed in an alternating arrangement,
wherein the transparent electrode is partially overlapped with the first data line, the second data line, or both the first data line and the second data line,
wherein an overlapping width of the transparent electrode with the first data line differs from an overlapping width of the transparent electrode with the second data line,
wherein first widths with which transparent electrodes of the different blocks overlap the second data line are different from one another, and
wherein second widths with which the transparent electrodes of the different blocks overlap the first data line are different from one another.

2. The display substrate of claim 1, wherein a transparent electrode of the first block partially overlaps with the second data line, a transparent electrode of a (K+1)/2-th block, K being an odd number that is greater than or equal 3, partially overlaps with the first data line and the second data line, and a transparent electrode of the K-th block partially overlaps with the first data line.

3. The display substrate of claim 1, wherein the first widths with which the transparent electrodes overlap the second data line gradually decrease from the first block to the K-th block.

4. The display substrate of claim 1, wherein the second widths, with which the transparent electrodes overlap the first data line gradually increase from the first block to the K-th block.

5. The display substrate of claim 1, wherein a distance of the interval disposed between the respective transparent electrodes adjacent to the second data line is uniformly formed in each of the first to K-th blocks.

6. The display substrate of claim 5, wherein a sum of a width with which a transparent electrode overlaps the second data line and a width with which an adjacent transparent electrode overlaps the second data line remains constant from the first block to the K-th block.

7. The display substrate of claim 1, wherein the first shield pattern covers a first terminal of the first pixel electrode, and the second shield pattern covers a first terminal of the second pixel electrode.

8. The display substrate of claim 7, further comprising:
a third shield pattern disposed adjacent to the second data line, the third shield pattern covering a second terminal of the first pixel electrode; and a fourth shield pattern disposed adjacent to the first data line, the fourth shield pattern covering a second terminal of the second pixel electrode.

9. The display substrate of claim 8, further comprising:
a first terminal of the transparent electrode comprising a second terminal of the first pixel electrode and the first terminal of the second pixel electrode that are formed in the first block, wherein the first terminal partially overlaps with the second data line;
two terminals of the transparent electrode formed in a (K+1)/2-th block partially overlap with the first data line and the second data line; and
a second terminal of the transparent electrode comprising the first terminal of the first pixel electrode and a second terminal of the second pixel electrode that are formed in the K-th block, wherein the second terminal partially overlaps with the first data line.

10. The display substrate of claim 9, wherein a first width with which the first terminal of the transparent electrode overlaps the second data line gradually decreases from the first block to the K-th block.

11. The display substrate of claim 9, wherein a second width with which the second terminal of the transparent electrode overlaps the first data line gradually increases from the first block to the K-th block.

12. A method of manufacturing a display substrate, the method comprising:
forming a plurality of gate lines and a power line extended in a first direction, a first shield pattern extended in a second direction and a second shield pattern facing the first shield pattern on a substrate, the gate lines being divided into first to K-th blocks, K being an odd number;
forming a first data line extended in the second direction adjacent to the first shield pattern and a second data line adjacent to the second shield pattern to face with the first data line; and
forming a transparent electrode in each block partially overlapping with the first data line, the second data line or both the first data line and the second data line, the transparent electrode comprising a first pixel electrode partially overlapped with a first end portion of the first shield pattern to couple to the first shield pattern, a gate line and the first data line, and a second pixel electrode being partially overlapped with a first end portion of the second shield pattern and being alternately disposed with the first pixel electrode to couple to the gate line and the first power line,
wherein a width of the first pixel electrode corresponding to the partial overlap with the first end portion of the first shield pattern is different from a width the second pixel electrode corresponding to the partial overlap with the first end portion of the second shield pattern,
wherein first widths with which transparent electrodes of the different blocks overlap the second data line are different from one another, and
wherein second widths with which the transparent electrodes of the different blocks overlap the first data line are different from one another.

13. The method of claim 12, further comprising:
forming a third shield pattern disposed adjacent to the second data line, the third shield pattern covering a second terminal of the first pixel electrode; and
forming a fourth shield pattern disposed adjacent to the first data line, the fourth shield pattern covering a second terminal of the second pixel electrode.

14. The method of claim 12, wherein a first width with which a first terminal of the transparent electrode overlaps the second data line gradually decreases from the first block to the K-th block, and a second width with which a second terminal of the transparent electrode overlaps the first data line gradually increases from the first block to the K-th block.

15. A display panel, comprising:
a first substrate comprising:
a plurality of gate lines divided into first to K-th blocks, K being an odd number,
a first shield pattern disposed adjacent to a first data line,
a second shield pattern disposed adjacent to a second data line facing the first data line,
wherein each block comprises:
a transparent electrode comprising a first pixel electrode coupled to the first data line and the first shield pattern, and a second pixel electrode coupled to a first power line and the second shield pattern, wherein the first pixel electrode and the second pixel electrode are disposed in an alternating arrangement, and the transparent electrode is partially overlapped with the first data line, the second data line or both the first data line and the second data line;
a second substrate comprising a light-blocking pattern; and
a liquid crystal layer interposed between the first substrate and the second substrate,
wherein a second width of the transparent electrode corresponding to the partial overlap with the first data line is different from a first width of the transparent electrode corresponding to the partial overlap with the second data line,
wherein first widths with which transparent electrodes of the different blocks overlap the second data line are different from one another, and
wherein second widths with which the transparent electrodes of the different blocks overlap the first data line are different from one another.

16. The display panel of claim 15, wherein liquid crystal molecules of the liquid crystal layer are vertically aligned when an electric field is not applied between the first substrate and the second substrate, and a horizontal electric field is formed by the first pixel electrode and the second pixel electrodes to which different voltages are applied.

17. The display panel of claim 15, wherein a dielectric constant of the light-blocking pattern is less than approximately 15.

18. The display panel of claim 15, further comprising:
a first width to define a first region comprising a plurality of the transparent electrodes provided by the different blocks, wherein the transparent electrodes corresponding to the first width are overlapped with the second data line and the overlapping portions are different from one another; and
a second width to define a second region comprising a plurality of the transparent electrodes provided by the different blocks, wherein the transparent electrodes corresponding to the second width are overlapped with the first data line and the overlapping portions are different from one another.

19. The display panel of claim 15, wherein a transparent electrode of the first block partially overlaps with the second data line, a transparent electrode of a (K+1)/2-th block, K being an odd number that is greater than or equal 3, partially overlaps with the first data line and the second data line, and a transparent electrode of the K-th block partially overlaps with the first data line.

* * * * *